United States Patent
Kasada

(10) Patent No.: US 10,403,316 B2
(45) Date of Patent: *Sep. 3, 2019

(54) MAGNETIC TAPE HAVING CHARACTERIZED MAGNETIC LAYER WITH SERVO PATTERN AND MAGNETIC TAPE DEVICE

(71) Applicant: FUJIFILM Corporation, Tokyo (JP)

(72) Inventor: Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/038,339

(22) Filed: Jul. 18, 2018

(65) Prior Publication Data

US 2019/0027177 A1 Jan. 24, 2019

(30) Foreign Application Priority Data

Jul. 19, 2017 (JP) ................. 2017-140022

(51) Int. Cl.
*G11B 5/706* (2006.01)
*G11B 5/008* (2006.01)
(Continued)

(52) U.S. Cl.
CPC ...... *G11B 5/70615* (2013.01); *G11B 5/00813* (2013.01); *G11B 5/00817* (2013.01);
(Continued)

(58) Field of Classification Search
CPC ..... G11B 5/735; G11B 5/70678; G11B 5/716; G11B 5/733
See application file for complete search history.

(56) References Cited

U.S. PATENT DOCUMENTS 3,966,686 A 6/1976 Asakura et al.
4,112,187 A 9/1978 Asakura et al.
(Continued)

FOREIGN PATENT DOCUMENTS

DE 101 46 429 A1 3/2002
GB 2495356 A 4/2013
(Continued)

OTHER PUBLICATIONS

"Introduction to TMR Magnetic Sensors", Anonymous, Mar. 12, 2015, MR Sensor Technology, pp. 1-5 (Year: 2015).
(Continued)

*Primary Examiner* — Brian E Miller
(74) *Attorney, Agent, or Firm* — Sughrue Mion, PLLC

(57) ABSTRACT

The magnetic tape includes a magnetic layer including ferromagnetic powder and a binding agent, in which a magnetic tape total thickness is equal to or smaller than 5.30 μm, the magnetic layer has a servo pattern, a center line average surface roughness Ra measured regarding a surface of the magnetic layer is equal to or smaller than 1.8 nm, the ferromagnetic powder is ferromagnetic hexagonal ferrite powder, an intensity ratio of a peak intensity of a diffraction peak of a (110) plane with respect to a peak intensity of a diffraction peak of a (114) plane of a hexagonal ferrite crystal structure obtained by an X-ray diffraction analysis of the magnetic layer by using an In-Plane method is 0.5 to 4.0, and a vertical direction squareness ratio of the magnetic tape is 0.65 to 1.00, and a magnetic tape device including this magnetic tape.

20 Claims, 1 Drawing Sheet

(51) Int. Cl.
*G11B 5/584* (2006.01)
*G11B 5/70* (2006.01)
(52) U.S. Cl.
CPC .............. *G11B 5/584* (2013.01); *G11B 5/70* (2013.01); *G11B 5/70678* (2013.01)

(56) References Cited

U.S. PATENT DOCUMENTS

| | | |
|---|---|---|
| 4,425,404 A | 1/1984 | Suzuki et al. |
| 4,693,930 A | 9/1987 | Kuo et al. |
| 4,746,569 A | 5/1988 | Takahashi et al. |
| 4,825,317 A | 4/1989 | Rausch |
| 5,242,752 A | 9/1993 | Isobe et al. |
| 5,419,938 A | 5/1995 | Kagotani et al. |
| 5,445,881 A | 8/1995 | Irie |
| 5,474,814 A | 12/1995 | Komatsu et al. |
| 5,496,607 A | 3/1996 | Inaba et al. |
| 5,540,957 A | 7/1996 | Ueda et al. |
| 5,585,032 A | 12/1996 | Nakata et al. |
| 5,645,917 A | 7/1997 | Ejiri et al. |
| 5,689,384 A | 11/1997 | Albrecht et al. |
| 5,728,454 A | 3/1998 | Inaba et al. |
| 5,786,074 A | 7/1998 | Soui |
| 5,827,600 A | 10/1998 | Ejiri et al. |
| 6,099,957 A | 8/2000 | Yamamoto et al. |
| 6,183,606 B1 | 2/2001 | Kuo et al. |
| 6,207,252 B1 | 3/2001 | Shimomura |
| 6,228,461 B1 | 5/2001 | Sueki et al. |
| 6,254,964 B1 | 7/2001 | Saito et al. |
| 6,261,647 B1 | 7/2001 | Komatsu et al. |
| 6,268,043 B1 | 7/2001 | Koizumi et al. |
| 6,496,328 B1 | 12/2002 | Dugas |
| 6,579,826 B2 | 6/2003 | Furuya et al. |
| 6,649,256 B1 | 11/2003 | Buczek et al. |
| 6,686,022 B2 | 2/2004 | Takano et al. |
| 6,770,359 B2 | 8/2004 | Masaki |
| 6,791,803 B2 | 9/2004 | Saito et al. |
| 6,835,461 B1 | 12/2004 | Yamagata et al. |
| 6,893,746 B1 | 5/2005 | Kirino et al. |
| 6,921,592 B2 | 7/2005 | Tani et al. |
| 6,939,606 B2 | 9/2005 | Hashimoto et al. |
| 6,950,269 B1 | 9/2005 | Johnson |
| 7,014,927 B2 | 3/2006 | Sueki et al. |
| 7,029,726 B1 | 4/2006 | Chen et al. |
| 7,153,366 B1 | 12/2006 | Chen et al. |
| 7,255,908 B2 | 8/2007 | Ishikawa et al. |
| 7,511,907 B2 | 3/2009 | Dugas et al. |
| 7,515,383 B2 | 4/2009 | Saito et al. |
| 7,803,471 B1 | 9/2010 | Ota et al. |
| 7,839,599 B2 | 11/2010 | Bui et al. |
| 8,000,057 B2 | 8/2011 | Bui et al. |
| 8,279,739 B2 | 10/2012 | Kanbe et al. |
| 8,524,108 B2 | 9/2013 | Hattori |
| 8,535,817 B2 | 9/2013 | Imaoka |
| 8,576,510 B2 | 11/2013 | Cherubini et al. |
| 8,681,451 B2 | 3/2014 | Harasawa et al. |
| 9,105,294 B2 | 8/2015 | Jensen et al. |
| 9,311,946 B2 | 4/2016 | Tanaka et al. |
| 9,495,985 B2 | 11/2016 | Biskeborn et al. |
| 9,530,444 B2 | 12/2016 | Kasada |
| 9,542,967 B2 | 1/2017 | Sekiguchi et al. |
| 9,564,161 B1 | 2/2017 | Cherubini et al. |
| 9,601,146 B2 | 3/2017 | Kasada et al. |
| 9,704,425 B2 | 7/2017 | Zhang et al. |
| 9,704,525 B2 | 7/2017 | Kasada |
| 9,704,527 B2 | 7/2017 | Kasada |
| 9,711,174 B2 | 7/2017 | Kasada et al. |
| 9,721,605 B2 | 8/2017 | Oyanagi et al. |
| 9,721,606 B2 | 8/2017 | Kasada |
| 9,721,607 B2 | 8/2017 | Tada et al. |
| 9,748,026 B2 | 8/2017 | Shirata |
| 9,773,519 B2 | 9/2017 | Kasada et al. |
| 9,779,772 B1 | 10/2017 | Kasada et al. |
| 9,837,116 B2 | 12/2017 | Ozawa et al. |
| 9,959,894 B2 | 5/2018 | Omura |
| 9,972,351 B1 | 5/2018 | Tetsuya et al. |
| 9,978,414 B1 | 5/2018 | Kaneko et al. |
| 9,984,710 B2 | 5/2018 | Kasada |
| 9,984,712 B1 | 5/2018 | Ozawa |
| 9,984,716 B1 | 5/2018 | Kaneko et al. |
| 10,008,230 B1 | 6/2018 | Ozawa et al. |
| 10,026,430 B2 | 7/2018 | Kasada et al. |
| 10,026,433 B2 | 7/2018 | Kasada et al. |
| 10,026,434 B2 | 7/2018 | Oyanagi et al. |
| 10,026,435 B2 | 7/2018 | Kasada et al. |
| 10,062,403 B1 | 8/2018 | Kasada et al. |
| 10,074,393 B2 | 9/2018 | Kaneko et al. |
| 10,134,433 B2 | 11/2018 | Kasada et al. |
| 10,170,144 B2 | 1/2019 | Ozawa et al. |
| 2001/0038928 A1 | 11/2001 | Nakamigawa et al. |
| 2001/0053458 A1 | 12/2001 | Suzuki et al. |
| 2002/0072472 A1 | 7/2002 | Furuya et al. |
| 2002/0122339 A1 | 9/2002 | Takano et al. |
| 2003/0059649 A1 | 3/2003 | Saliba et al. |
| 2003/0091866 A1 | 5/2003 | Ejiri et al. |
| 2003/0124386 A1 | 7/2003 | Masaki |
| 2003/0170498 A1 | 9/2003 | Inoue |
| 2003/0228493 A1* | 12/2003 | Doushita ............... G11B 5/70 428/843.3 |
| 2004/0018388 A1 | 1/2004 | Kitamura et al. |
| 2004/0053074 A1* | 3/2004 | Jingu ................. G11B 5/7325 428/837 |
| 2004/0197605 A1* | 10/2004 | Seki ..................... G11B 5/70 428/842 |
| 2004/0213948 A1 | 10/2004 | Saito et al. |
| 2004/0218304 A1 | 11/2004 | Goker et al. |
| 2004/0265643 A1 | 12/2004 | Ejiri |
| 2005/0057838 A1 | 3/2005 | Ohtsu |
| 2005/0153170 A1 | 7/2005 | Inoue et al. |
| 2005/0196645 A1 | 9/2005 | Doi et al. |
| 2005/0260456 A1 | 11/2005 | Hanai et al. |
| 2005/0260459 A1 | 11/2005 | Hanai et al. |
| 2005/0264935 A1 | 12/2005 | Sueki et al. |
| 2006/0008681 A1 | 1/2006 | Hashimoto et al. |
| 2006/0035114 A1 | 2/2006 | Kuse et al. |
| 2006/0056095 A1 | 3/2006 | Saitou |
| 2006/0068232 A1* | 3/2006 | Mikamo ............ G11B 5/70626 428/842.9 |
| 2006/0232883 A1 | 10/2006 | Biskeborn et al. |
| 2007/0009769 A1* | 1/2007 | Kanazawa ............. B26D 1/245 428/845.5 |
| 2007/0020490 A1 | 1/2007 | Harasawa et al. |
| 2007/0224456 A1 | 9/2007 | Murao et al. |
| 2007/0230054 A1 | 10/2007 | Takeda et al. |
| 2007/0231606 A1 | 10/2007 | Hanai |
| 2008/0057351 A1* | 3/2008 | Meguro ................ G11B 5/735 428/840 |
| 2008/0144211 A1 | 6/2008 | Weber et al. |
| 2008/0152956 A1 | 6/2008 | Murayama et al. |
| 2008/0174897 A1 | 7/2008 | Bates et al. |
| 2008/0297950 A1 | 12/2008 | Noguchi et al. |
| 2008/0311308 A1 | 12/2008 | Lee et al. |
| 2009/0027812 A1 | 1/2009 | Noguchi et al. |
| 2009/0087689 A1 | 4/2009 | Doushita et al. |
| 2009/0161249 A1 | 6/2009 | Takayama et al. |
| 2009/0162701 A1 | 6/2009 | Jensen et al. |
| 2010/0000966 A1 | 1/2010 | Kamata et al. |
| 2010/0035086 A1 | 2/2010 | Inoue et al. |
| 2010/0035088 A1 | 2/2010 | Inoue |
| 2010/0053810 A1 | 3/2010 | Biskeborn et al. |
| 2010/0081011 A1 | 4/2010 | Nakamura |
| 2010/0134929 A1 | 6/2010 | Ito |
| 2010/0227201 A1 | 9/2010 | Sasaki et al. |
| 2010/0246073 A1 | 9/2010 | Katayama |
| 2011/0003241 A1 | 1/2011 | Kaneko et al. |
| 2011/0051280 A1 | 3/2011 | Karp et al. |
| 2011/0052908 A1 | 3/2011 | Imaoka |
| 2011/0077902 A1 | 3/2011 | Awezec et al. |
| 2011/0151281 A1 | 6/2011 | Inoue |
| 2011/0244272 A1 | 10/2011 | Suzuki et al. |
| 2012/0045664 A1 | 2/2012 | Tanaka et al. |
| 2012/0177951 A1 | 7/2012 | Yamazaki et al. |
| 2012/0183811 A1 | 7/2012 | Hattori et al. |
| 2012/0196156 A1 | 8/2012 | Suzuki |

(56) References Cited

U.S. PATENT DOCUMENTS

| | | |
|---|---|---|
| 2012/0243120 A1 | 9/2012 | Harasawa et al. |
| 2012/0244387 A1 | 9/2012 | Mori et al. |
| 2012/0251845 A1 | 10/2012 | Wang et al. |
| 2013/0029183 A1 | 1/2013 | Omura |
| 2013/0084470 A1 | 4/2013 | Hattori et al. |
| 2013/0088794 A1 | 4/2013 | Cherubini et al. |
| 2013/0256584 A1 | 10/2013 | Yamazaki et al. |
| 2013/0260179 A1 | 10/2013 | Kasada et al. |
| 2013/0279040 A1 | 10/2013 | Cideciyan et al. |
| 2013/0286510 A1 | 10/2013 | Rothermel et al. |
| 2014/0011055 A1 | 1/2014 | Suzuki et al. |
| 2014/0130067 A1 | 5/2014 | Madison et al. |
| 2014/0139944 A1 | 5/2014 | Johnson et al. |
| 2014/0272474 A1 | 9/2014 | Ozawa et al. |
| 2014/0295214 A1 | 10/2014 | Tada et al. |
| 2014/0342189 A1 | 11/2014 | Tachibana et al. |
| 2014/0366990 A1 | 12/2014 | Lai et al. |
| 2014/0374645 A1 | 12/2014 | Kikuchi et al. |
| 2015/0043101 A1 | 2/2015 | Biskeborn et al. |
| 2015/0098149 A1 | 4/2015 | Bates et al. |
| 2015/0111066 A1 | 4/2015 | Terakawa et al. |
| 2015/0123026 A1 | 5/2015 | Masada et al. |
| 2015/0302879 A1 | 10/2015 | Holmberg et al. |
| 2015/0380036 A1 | 12/2015 | Kasada et al. |
| 2016/0061447 A1 | 3/2016 | Kobayashi |
| 2016/0064025 A1 | 3/2016 | Kurokawa et al. |
| 2016/0092315 A1 | 3/2016 | Ashida et al. |
| 2016/0093321 A1 | 3/2016 | Aoshima et al. |
| 2016/0093322 A1 | 3/2016 | Kasada et al. |
| 2016/0093323 A1 | 3/2016 | Omura |
| 2016/0180875 A1 | 6/2016 | Tanaka et al. |
| 2016/0189739 A1 | 6/2016 | Kasada et al. |
| 2016/0189740 A1 | 6/2016 | Oyanagi et al. |
| 2016/0247530 A1 | 8/2016 | Kasada |
| 2016/0260449 A1 | 9/2016 | Ahmad et al. |
| 2016/0276076 A1 | 9/2016 | Kasada |
| 2017/0032812 A1 | 2/2017 | Kasada |
| 2017/0053669 A1 | 2/2017 | Kasada |
| 2017/0053670 A1* | 2/2017 | Oyanagi ............ G11B 5/70 |
| 2017/0053671 A1 | 2/2017 | Kasada et al. |
| 2017/0058227 A1 | 3/2017 | Kondo et al. |
| 2017/0092315 A1 | 3/2017 | Ozawa et al. |
| 2017/0130156 A1 | 5/2017 | Kondo et al. |
| 2017/0178675 A1 | 6/2017 | Kasada |
| 2017/0178676 A1 | 6/2017 | Kasada |
| 2017/0178677 A1 | 6/2017 | Kasada |
| 2017/0186456 A1 | 6/2017 | Tada et al. |
| 2017/0186460 A1 | 6/2017 | Kasada et al. |
| 2017/0221513 A1 | 8/2017 | Hiroi et al. |
| 2017/0221516 A1 | 8/2017 | Oyanagi et al. |
| 2017/0221517 A1 | 8/2017 | Ozawa et al. |
| 2017/0249963 A1 | 8/2017 | Oyanagi et al. |
| 2017/0249964 A1 | 8/2017 | Kasada et al. |
| 2017/0249965 A1 | 8/2017 | Kurokawa et al. |
| 2017/0249966 A1 | 8/2017 | Tachibana et al. |
| 2017/0287517 A1 | 10/2017 | Hosoya et al. |
| 2017/0337944 A1 | 11/2017 | Biskeborn et al. |
| 2017/0355022 A1 | 12/2017 | Kaneko et al. |
| 2017/0358318 A1 | 12/2017 | Kasada et al. |
| 2017/0372726 A1 | 12/2017 | Kasada et al. |
| 2017/0372727 A1 | 12/2017 | Kasada et al. |
| 2017/0372736 A1 | 12/2017 | Kaneko et al. |
| 2017/0372737 A1 | 12/2017 | Oyanagi et al. |
| 2017/0372738 A1 | 12/2017 | Kasada |
| 2017/0372739 A1 | 12/2017 | Ozawa et al. |
| 2017/0372740 A1 | 12/2017 | Ozawa et al. |
| 2017/0372741 A1 | 12/2017 | Kurokawa et al. |
| 2017/0372742 A1 | 12/2017 | Kaneko et al. |
| 2017/0372743 A1 | 12/2017 | Kasada et al. |
| 2017/0372744 A1 | 12/2017 | Ozawa et al. |
| 2018/0061446 A1 | 3/2018 | Kasada |
| 2018/0061447 A1 | 3/2018 | Kasada |
| 2018/0082710 A1 | 3/2018 | Tada et al. |
| 2018/0137887 A1 | 5/2018 | Sekiguchi et al. |
| 2018/0182417 A1 | 6/2018 | Kaneko et al. |
| 2018/0182422 A1 | 6/2018 | Kawakami et al. |
| 2018/0182425 A1 | 6/2018 | Kasada et al. |
| 2018/0182426 A1 | 6/2018 | Ozawa et al. |
| 2018/0182427 A1 | 6/2018 | Kasada et al. |
| 2018/0182429 A1 | 6/2018 | Kasada et al. |
| 2018/0182430 A1 | 6/2018 | Ozawa et al. |
| 2018/0182428 A1 | 7/2018 | Kasada et al. |
| 2018/0240475 A1 | 8/2018 | Kasada |
| 2018/0240476 A1 | 8/2018 | Kasada et al. |
| 2018/0240478 A1 | 8/2018 | Kasada et al. |
| 2018/0240479 A1 | 8/2018 | Kasada et al. |
| 2018/0240481 A1 | 8/2018 | Kasada et al. |
| 2018/0240488 A1 | 8/2018 | Kasada |
| 2018/0240489 A1 | 8/2018 | Kasada et al. |
| 2018/0240490 A1 | 8/2018 | Kurokawa et al. |
| 2018/0240491 A1 | 8/2018 | Ozawa et al. |
| 2018/0240492 A1 | 8/2018 | Kasada |
| 2018/0240493 A1 | 8/2018 | Tada et al. |
| 2018/0240494 A1 | 8/2018 | Kurokawa et al. |
| 2018/0240495 A1 | 8/2018 | Kasada |
| 2018/0286439 A1 | 10/2018 | Ozawa et al. |
| 2018/0286442 A1 | 10/2018 | Ozawa et al. |
| 2018/0286443 A1 | 10/2018 | Ozawa et al. |
| 2018/0286444 A1 | 10/2018 | Kasada et al. |
| 2018/0286446 A1 | 10/2018 | Ozawa et al. |
| 2018/0286447 A1* | 10/2018 | Ozawa ............... G11B 5/712 |
| 2018/0286448 A1 | 10/2018 | Ozawa et al. |
| 2018/0286449 A1* | 10/2018 | Kasada ............... G11B 5/714 |
| 2018/0286450 A1* | 10/2018 | Kasada ............... G11B 5/70 |
| 2018/0286451 A1 | 10/2018 | Ozawa et al. |
| 2018/0286452 A1 | 10/2018 | Ozawa et al. |
| 2018/0286453 A1* | 10/2018 | Kasada ............... G11B 5/714 |
| 2018/0301165 A1 | 10/2018 | Oyanagi et al. |
| 2018/0350398 A1 | 12/2018 | Kawakami et al. |
| 2018/0350400 A1 | 12/2018 | Kaneko et al. |
| 2018/0358042 A1 | 12/2018 | Kasada et al. |
| 2018/0374507 A1* | 12/2018 | Kasada ............... G11B 5/70615 |
| 2019/0027167 A1 | 1/2019 | Tada et al. |
| 2019/0027168 A1 | 1/2019 | Kasada et al. |
| 2019/0027171 A1* | 1/2019 | Kasada ............... G11B 5/647 |
| 2019/0027172 A1* | 1/2019 | Kasada ............... G11B 5/647 |
| 2019/0027174 A1* | 1/2019 | Tada ................... G11B 5/66 |
| 2019/0027175 A1* | 1/2019 | Kurokawa ........... G11B 5/702 |
| 2019/0027176 A1 | 1/2019 | Kurokawa et al. |
| 2019/0027177 A1* | 1/2019 | Kasada ............... G11B 5/70615 |
| 2019/0027178 A1* | 1/2019 | Kasada ............... G11B 5/735 |
| 2019/0027179 A1* | 1/2019 | Ozawa ............... G11B 5/735 |
| 2019/0027180 A1* | 1/2019 | Kasada ............... G11B 5/735 |
| 2019/0027181 A1* | 1/2019 | Ozawa ............... G11B 5/78 |
| 2019/0035424 A1 | 1/2019 | Endo |
| 2019/0051325 A1 | 2/2019 | Kasada et al. |
| 2019/0088278 A1 | 3/2019 | Kasada et al. |
| 2019/0096437 A1 | 3/2019 | Ozawa et al. |
| 2019/0103130 A1 | 4/2019 | Kasada et al. |
| 2019/0103131 A1 | 4/2019 | Kasada et al. |
| 2019/0103133 A1 | 4/2019 | Ozawa et al. |
| 2019/0103134 A1 | 4/2019 | Kasada et al. |
| 2019/0103135 A1 | 4/2019 | Ozawa et al. |
| 2019/0130936 A1 | 5/2019 | Kaneko et al. |

FOREIGN PATENT DOCUMENTS

| | | |
|---|---|---|
| JP | 61-139923 A | 6/1986 |
| JP | 61-139932 A | 6/1986 |
| JP | 63-129519 A | 6/1988 |
| JP | 63-249932 A | 10/1988 |
| JP | 61-11924 A | 1/1989 |
| JP | 64-57422 A | 3/1989 |
| JP | 64-60819 A | 3/1989 |
| JP | 5-258283 A | 10/1993 |
| JP | 5-298653 A | 11/1993 |
| JP | 7-57242 A | 3/1995 |
| JP | 11-110743 A | 4/1999 |
| JP | 11-175949 A | 7/1999 |
| JP | 11-273051 A | 10/1999 |
| JP | 2000-251240 A | 9/2000 |
| JP | 2002-157726 A | 5/2002 |
| JP | 2002-329605 A | 11/2002 |
| JP | 2002-367142 A | 12/2002 |

(56) References Cited

FOREIGN PATENT DOCUMENTS

| | | |
|---|---|---|
| JP | 2002-367318 A | 12/2002 |
| JP | 2003-77116 A | 3/2003 |
| JP | 2003-323710 A | 11/2003 |
| JP | 2004-5820 A | 1/2004 |
| JP | 2004-133997 A | 4/2004 |
| JP | 2004-185676 A | 7/2004 |
| JP | 2005-38579 A | 2/2005 |
| JP | 2005-243063 A | 9/2005 |
| JP | 2005-243162 A | 9/2005 |
| JP | 2006-92672 A | 4/2006 |
| JP | 2006-286114 A | 10/2006 |
| JP | 2007-273039 A | 10/2007 |
| JP | 2007-287310 A | 11/2007 |
| JP | 2007-297427 A | 11/2007 |
| JP | 2008-243317 A | 10/2008 |
| JP | 2009-283082 A | 12/2009 |
| JP | 2010-49731 A | 3/2010 |
| JP | 2011-48878 A | 3/2011 |
| JP | 2011-210288 A | 10/2011 |
| JP | 2011-225417 A | 11/2011 |
| JP | 2012-38367 A | 2/2012 |
| JP | 2012-43495 A | 3/2012 |
| JP | 2012-203955 A | 10/2012 |
| JP | 2013-77360 A | 4/2013 |
| JP | 2013-164889 A | 8/2013 |
| JP | 2014-15453 A | 1/2014 |
| JP | 2014-179149 A | 9/2014 |
| JP | 2015-39801 A | 3/2015 |
| JP | 2015-111484 A | 6/2015 |
| JP | 2016-15183 A | 1/2016 |
| JP | 2016-051493 A | 4/2016 |

OTHER PUBLICATIONS

Notice of Allowance dated Aug. 27, 2018 in U.S. Appl. No. 15/920,635.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Notice of Allowance dated Jan. 30, 2019 in U.S. Appl. No. 15/854,409.
Notice of Allowance dated Mar. 13, 2019 in U.S Appl. No. 16/100,289.
Notice of Allowance dated Mar. 18, 2019 in U.S. Appl. No. 15/626,355.
Notice of Allowance dated Mar. 18, 2019 in U.S. Appl. No. 15/628,814.
Notice of Allowance dated Mar. 5, 2019 in U.S. Appl. No. 16/009,603.
Office Action dated Dec. 19, 2018 in U.S. Appl. No. 15/900,345.
Office Action dated Dec. 19, 2018 in U.S. Appl. No. 15/900,379.
Office Action dated Dec. 20, 2018 in U.S. Appl. No. 15/900,106.
Office Action dated Dec. 20, 2018 in U.S. Appl. No. 15/900,242.
Office Action dated Dec. 21, 2018 in U.S. Appl. No. 15/900,160.
Office Action dated Dec. 21, 2018 in U.S. Appl. No. 15/920,616.
Office Action dated Dec. 27, 2018 in U.S. Appl. No. 15/900,334.
Office Action dated Dec. 7, 2018 in U.S. Appl. No. 15/920,592.
Office Action dated Feb. 21, 2019 in U.S. Appl. No. 15/854,383.
Office Action dated Feb. 26, 2019 in Japanese Application No. 2016-123207.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 26, 2019 in U.S. Appl. No. 15/626,832.
Office Action dated Feb. 28, 2019 in U.S. Appl. No. 15/920,518.
Office Action dated Feb. 5, 2019 in Japanese Application No. 2016-117339.
Office Action dated Feb. 5, 2019 in Japanese Application No. 2016-123205.
Office Action dated Feb. 5, 2019 in Japanese Application No. 2016-169871.
Office Action dated Feb. 7, 2019 in U.S. Appl. No. 15/621,464.
Office Action dated Jan. 10, 2019 in U.S. Appl. No. 15/899,430.
Office Action dated Jan. 29, 2019 in U.S. Appl. No. 15/614,876.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.
Office Action dated Mar. 19, 2019 in Japanese Application No. 2016-116261.
Office Action dated Mar. 19, 2019 in Japanese Application No. 2016-124515.
Office Action dated Mar. 19, 2019 in Japanese Application No. 2016-124529.
Office Action dated Mar. 19, 2019 in Japanese Application No. 2016-124932.
Office Action dated Mar. 19, 2019 in Japanese Application No. 2016-124933.
Office Action dated Mar. 19, 2019 in Japanese Application No. 2016-124935.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 5, 2019 in U.S. Appl. No. 15/443,026.
Office Action dated Mar. 6, 2019 in U.S. Appl. No. 15/854,403.
Office Action dated Mar. 7, 2019 in U.S. Appl. No. 15/854,439.
Office Action dated Nov. 14, 2018 in U.S. Appl. No. 16/100,289.
Office Action dated Nov. 19, 2018 in U.S. Appl. No. 15/900,141.
Notice of Allowance dated Aug. 6, 2018, which issued during the prosecution of U.S. Appl. No. 15/920,768.
Notice of Allowance dated Dec. 3, 2018, which issued during the prosecution of U.S. Appl. No. 15/920,518.
Notice of Allowance dated Dec. 4, 2018, which issued during the prosecution of U.S. Appl. No. 15/625,428.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Dec. 21, 2018, which issued during the prosecution of U.S. Appl. No. 15/900,230.
Office Action dated Jul. 3, 2018, which issued during the prosecution of U.S. Appl. No. 15/920,518.
Office Action dated Nov. 28, 2018, which issued during the prosecution of U.S. Appl. No. 15/899,587.
Notice of Allowance dated Apr. 5, 2018, which issued during the prosecution of U.S. Appl. No. 14/867,752.
Notice of Allowance dated Aug. 9, 2018, which issued during the prosecution of U.S. Appl. No. 15/920,563.
Notice of Allowance dated Jul. 13, 2018, which issued during the prosecution of U.S. Appl. No. 15/920,782.
Notice of Allowance dated Jun. 28, 2017, which issued during the prosecution of U.S. Appl. No. 15/464,991.
Notice of Allowance dated Mar. 14, 2018, which issued during the prosecution of U.S. Appl. No. 15/854,474.
Notice of Allowance dated Mar. 19, 2018, which issued during the prosecution of U.S. Appl. No. 15/378,907.
Notice of Allowance dated Mar. 21, 2018, which issued during the prosecution of U.S. App. No. 15/241,286.
Notice of Allowance dated Mar. 21, 2018, which issued during the prosecution of U.S. Appl. No. 15/241,297.
Notice of Allowance dated Mar. 27, 2018, which issued during the prosecution of U.S. Appl. No. 15/241,631.
Notice of Allowance dated Oct. 6, 2016, which issued during the prosecution of U.S. Appl. No. 14/209,065.
Notice of Allowance dated Sep. 24, 2018, which issued during the prosecution of U.S. Appl. No. 15/854,438.

(56) References Cited

OTHER PUBLICATIONS

Office Action dated Apr. 19, 2018, which issued during the prosecution of U.S. Appl. No. 15/854,438.
Office Action dated Feb. 25, 2016, which issued during the prosecution of U.S. Appl. No. 14/867,752.
Office Action dated Oct. 5, 2017, which issued during the prosecution of U.S. Appl. No. 15/241,631.
Office Action dated Sep. 28, 2018, which issued during the prosecution of U.S. Appl. No. 15/854,409.
Office Action dated Dec. 25, 2018 in Japanese Application No. 2015-245144.
Office Action dated Dec. 25, 2018 in Japanese Application No. 2015-245145.
Office Action dated Dec. 25, 2018 in Japanese Application No. 2015-254192.
Office Action dated Dec. 31, 2018 in U.S. Appl. No. 16/009,603.
Office Action dated Jan. 27, 2015 from the Japanese Patent Office in Japanese Application No. 2013-053543.
Office Action dated Jan. 31, 2018, which issued during the prosecution of U.S. Appl. No. 14/867,752.
Office Action dated Jul. 6, 2015, which issued during the prosecution of U.S. Appl. No. 14/209,065.
Office Action dated Mar. 13, 2015, which issued during the prosecution of U.S. Appl. No. 14/209,065.
Office Action dated Mar. 16, 2017, which issued during the prosecution of U.S. Appl. No. 14/867,752.
Office Action dated Mar. 24, 2016, which issued during the prosecution of U.S. Appl. No. 14/209,065.
Office Action dated Nov. 28, 2018, which issued during the prosecution of U.S. Appl. No. 15/900,080.
Office Action dated Nov. 28, 2018, which issued during the prosecution of U.S. Appl. No. 15/900,144.
Office Action dated Nov. 8, 2016 from the Japanese Patent Office in Japanese Application No. 2014-199022.
Office Action dated Oct. 15, 2018, which issued during the prosecution of U.S. Appl. No. 15/854,403.
Office Action dated Oct. 19, 2016, which issued during the prosecution of U.S. Appl. No. 14/867,752.
Office Action dated Oct. 5, 2017, which issued during the prosecution of U.S. Appl. No. 15/241,286.
Office Action dated Oct. 5, 2017, which issued during the prosecution of U.S. Appl. No. 15/241,297.
Office Action dated Oct. 5, 2017, which issued during the prosecution of U.S. Appl. No. 15/378,907.
Office Action dated Nov. 29, 2018, which issued during the prosecution of U.S. Appl. No. 15/380,309.
Office Action dated Nov. 29, 2018, which issued during the prosecution of U.S. Appl. No. 15/422,821.
Office Action dated Sep. 10, 2015, which issued during the prosecution of U.S. Appl. No. 14/209,065.
Office Action dated Sep. 19, 2014, which issued during the prosecution of U.S. Appl. No. 14/209,065.
Office Action dated Sep. 7, 2017, which issued during the prosecution of U.S. Appl. No. 14/867,752.
Office Action dated Nov. 16, 2016 which issued during the prosecution of U.S. Appl. No. 15/072,550.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Office Action dated Oct. 22, 2018, which issued during the prosecution of U.S. Appl. No. 15/854,439.
Office Action dated Oct. 9, 2018, which issued during the prosecution of U.S. Appl. No. 15/628,814.
Office Action dated Sep. 24, 2018, which issued during the prosecution of U.S. Appl. No. 15/690,400.
Office Action dated Sep. 27, 2018, which issued during the prosecution of U.S. Appl. No. 15/690,906.
Office Action dated Sep. 27, 2018, which issued during the prosecution of U.S. Appl. No. 15/854,383.
Office Action dated Jun. 9, 2017 from U.S. Patent & Trademark Office in U.S. Appl. No. 15/388,864.
Office Action dated Nov. 18, 2016 from U.S. Patent & Trademark Office in U.S. Appl. No. 14/753,227.
Office Action dated Aug. 15, 2016 from U.S. Patent & Trademark Office in U.S. Appl. No. 14/753,227.
Notice of Allowance dated Apr. 25, 2017 which issued during the prosecution of U.S. Appl. No. 15/072,550.
Notice of Allowance dated Mar. 16, 2018 which issued during the prosecution of U.S. Appl. No. 15/854,410.
Notice of Allowance dated May 10, 2018 which issued during the prosecution of U.S. Appl. No. 15/615,871.
Notice of Allowance dated Oct. 12, 2018, which issued during the prosecution of U.S. Appl. No. 15/626,832.
Office Action dated Jul. 6, 2018, which issued during the prosecution of U.S. Appl. No. 15/848,173.
Notice of Allowance, dated Dec. 2, 2016, issued by the U.S. Patent and Trademark Office in U.S. Appl. No. 14/753,227.
Notice of Allowance, dated Jul. 12, 2017, issued by the U.S. Patent and Trademark Office in U.S. Appl. No. 15/388,864.
Office Action dated Apr. 26, 2017 from U.S. Patent & Trademark Office in U.S. Appl. No. 15/388,864.
Office Action dated Aug. 3, 2018 from U.S. Patent & Trademark Office in U.S. Appl. No. 15/388,911.
Office Action dated Feb. 4, 2016 from U.S. Patent & Trademark Office in U.S. Appl. No. 14/753,227.
Office Action dated Jun. 7, 2018 from U.S. Patent & Trademark Office in U.S. Appl. No. 15/380,309.
Office Action dated May 30, 2018 from U.S. Patent & Trademark Office in U.S. Appl. No. 15/388,911.
Office Action dated Oct. 3, 2018 from the United States Patent and Trademark Office in U.S. Appl. No. 15/280,195.
Notice of Allowance dated Aug. 28, 2018, which issued during the prosecution of U.S. Appl. No. 15/422,821.
Office Action dated May 7, 2018 from the United States Patent and Trademark Office in U.S. Appl. No. 15/624,792.
Office Action dated Aug. 23, 2018 from the United States Patent and Trademark Office in U.S. Appl. No. 15/614,876.
Office Action dated Aug. 23, 2018 from the United States Patent and Trademark Office in U.S. Appl. No. 15/621,464.
Office Action dated Aug. 23, 2018 from the United States Patent and Trademark Office in U.S. Appl. No. 15/626,720.
Office Action dated Aug. 3, 2018 from the United States Patent and Trademark Office in U.S. Appl. No. 15/380,336.
Office Action dated Dec. 5, 2016 from the United States Patent and Trademark Office in U.S. Appl. No. 14/978,834.
Office Action dated Dec. 6, 2016 from the United States Patent and Trademark Office in U.S. Appl. No. 14/757,555.
Office Action dated May 2, 2018 from the United States Patent and Trademark Office in U.S. Appl. No. 15/280,195.
Office Action dated May 4, 2018 from the United States Patent and Trademark Office in U.S. Appl. No. 15/422,821.
Office Action dated May 4, 2018 from the United States Patent and Trademark Office in U.S. Appl. No. 15/422,944.
Office Action dated May 4, 2018 from the United States Patent and Trademark Office in U.S. Appl. No. 15/625,428.
Office Action dated May 7, 2018 from the United States Patent and Trademark Office in U.S. Appl. No. 15/624,897.
Office Action dated May 7, 2018 from the United States Patent and Trademark Office in U.S. Appl. No. 15/626,832.
Notice of Allowance dated Apr. 27, 2017, which issued during the prosecution of U.S. Appl. No. 15/052,115.
Notice of Allowance dated Aug. 30, 2017, which issued during the prosecution of U.S. Appl. No. 15/466,143.
Notice of Allowance dated Jun. 2, 2017, which issued during the prosecution of U.S. Appl. No. 15/218,190.
Notice of Allowance dated May 8, 2017, which issued during the prosecution of U.S. Appl. No. 14/757,555.
Notice of Allowance dated May 8, 2017, which issued during the prosecution of U.S. Appl. No. 14/978,834.
Notice of Allowance dated Sep. 4, 2018, which issued during the prosecution of U.S. Appl. No. 15/625,428.

(56) References Cited

OTHER PUBLICATIONS

Office Action dated Oct. 15, 2018, which issued during the prosecution of U.S. Appl. No. 15/619,012.
Notice of Allowance dated Oct. 11, 2018, which issued during the prosecution of U.S. Appl. No. 15/380,336.
Notice of Allowance dated Oct. 11, 2018, which issued during the prosecution of U.S. Appl. No. 15/422,944.
Notice of Allowance dated Oct. 11, 2018, which issued during the prosecution of U.S. Appl. No. 15/624,792.
Notice of Allowance dated Oct. 11, 2018, which issued during the prosecution of U.S. Appl. No. 15/624,897.
Office Action dated Mar. 27, 2019 in U.S. Appl. No. 15/690,400.
Office Action dated Aug. 10, 2017, which issued during the prosecution of U.S Appl. No. 14/870,618.
Office Action dated Feb. 4, 2016 which issued during the prosecution of U.S Appl. No. 14/753,227.
Office Action dated Jun. 7, 2018 which issued during the prosecution of U.S. Appl. No. 15/380,309.
Office Action dated Aug. 24, 2018 from the United States Patent and Trademark Office in U.S. Appl. No. 15/620,916.
Office Action dated May 30, 2018 which issued during the prosecution of U.S Appl. No. 15/388,911.
Notice of Allowance dated Feb. 14, 2018, which issued during the prosecution of U.S. Appl. No. 14/870,618.
Office Action dated Sep. 26, 2017 issued by the Japanese Patent Office in JP Appln. No. 2014-265723.
Office Action dated Sep. 26, 2017 issued by the Japanese Patent Office in JP Appln. No. 2015-249264.
Office Action dated Jan. 30, 2019 in U.S. Appl. No. 15/620,916.
Notice of Allowance dated Apr. 30, 2019 in U.S. Appl. No. 15/380,309.
Notice of Allowance dated Jun. 6, 2019 in U.S. Appl. No. 15/854,383.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,106.
Notice of Allowance dated May 15, 2019 in U.S. Appl. No. 15/900,242.
Notice of Allowance dated May 16, 2019 in U.S. Appl. No. 15/614,876.
Notice of Allowance dated May 16, 2019 in U.S. Appl. No. 15/621,464.
Notice of Allowance dated May 24, 2019 in U.S. Appl. No. 15/900,345.
Notice of Allowance dated May 24, 2019 in U.S. Appl. No. 16/143,646.
Notice of Allowance dated May 28, 2019 in U.S. Appl. No. 15/920,616.
Notice of Allowance dated May 29, 2019 in U.S. Appl. No. 15/900,160.
Notice of Allowance dated May 29, 2019 in U.S. Appl. No. 15/900,334.
Notice of Allowance dated May 30, 2019 in U.S. Appl. No. 15/900,230.
Office Action dated Apr. 23, 2019 in Japanese Application No. 2016-169851.
Office Action dated Apr. 23, 2019 in Japanese Application No. 2016-182230.
Office Action dated Jun. 10, 2019 in U.S. Appl. No. 15/920,518.
Office Action dated Jun. 6, 2019 in U.S. Appl. No. 15/899,587.
Office Action dated May 23, 2019 in U.S. Appl. No. 15/388,911.
Notice of Allowance dated Apr. 16, 2019 in U.S. Appl. No. 15/625,428.
Office Action dated Apr. 15, 2019 in U.S. Appl. No. 16/182,083.
Office Action dated Apr. 16, 2019 in U.S. Appl. No. 16/232,165.
Notice of Allowance dated Jun. 25, 2019 in U.S. Appl. No. 15/620,916.
Office Action dated Jun. 25, 2019 in Japanese Application No. 2015-245144.
Notice of Allowance dated Jun. 27, 2019 in U.S. Appl. No. 15/854,439.

* cited by examiner

US 10,403,316 B2

MAGNETIC TAPE HAVING CHARACTERIZED MAGNETIC LAYER WITH SERVO PATTERN AND MAGNETIC TAPE DEVICE

CROSS-REFERENCE TO RELATED APPLICATIONS

This application claims priority under 35 U.S.C 119 to Japanese Patent Application No. 2017-140022 filed on Jul. 19, 2017. The above application is hereby expressly incorporated by reference, in its entirety, into the present application.

BACKGROUND OF THE INVENTION

1. Field of the Invention

The present invention relates to a magnetic tape and a magnetic tape device.

2. Description of the Related Art

Magnetic recording media are divided into tape-shaped magnetic recording media and disk-shaped magnetic recording media, and tape-shaped magnetic recording media, that is, magnetic tapes (hereinafter, also simply referred to as "tapes") are mainly used for data storage such as data back-up or archive. The recording of information on a magnetic tape is normally performed by recording a magnetic signal on a data band of the magnetic tape. Accordingly, data tracks are formed in the data band.

An increase in recording capacity (high capacity) of the magnetic tape is required in accordance with a great increase in information content in recent years. As means for realizing high capacity, a technology of disposing a larger amount of data tracks in a width direction of the magnetic tape by narrowing the width of the data track to increase recording density is used.

However, in a case where the width of the data track is narrowed and the recording and/or reproduction of information is performed by allowing the running of the magnetic tape in a magnetic tape device (normally referred to as a "drive"), it is difficult that a magnetic head correctly follows the data tracks due to the position change of the magnetic tape, and errors may easily occur at the time of recording and/or reproduction. Thus, as means for preventing occurrence of such errors, a system using a head tracking servo using a servo signal (hereinafter, referred to as a "servo system") has been recently proposed and practically used (for example, see U.S. Pat. No. 5,689,384A).

SUMMARY OF THE INVENTION

In a magnetic servo type servo system among the servo systems, a servo signal (servo pattern) is formed in a magnetic layer of a magnetic tape, and this servo pattern is magnetically read to perform head tracking. More specific description is as follows.

First, a servo head reads a servo pattern to be formed in a magnetic layer (that is, reproduces a servo signal). A position of a magnetic head in a magnetic tape device is controlled in accordance with a value obtained by reading the servo pattern. Accordingly, in a case of transporting the magnetic tape in the magnetic tape device for recording and/or reproducing information, it is possible to increase an accuracy of the magnetic head following the data track, even in a case where the position of the magnetic tape is changed. For example, even in a case where the position of the magnetic tape is changed in the width direction with respect to the magnetic head, in a case of recording and/or reproducing information by transporting the magnetic tape in the magnetic tape device, it is possible to control the position of the magnetic head in the width direction of the magnetic tape in the magnetic tape device, by performing the head tracking servo. By doing so, it is possible to correctly record information on the magnetic tape and/or correctly reproduce information recorded on the magnetic tape in the magnetic tape device.

Meanwhile, the magnetic tape is normally used to be accommodated and circulated in a magnetic tape cartridge. In order to increase recording capacity for one reel of the magnetic tape cartridge, it is desired to increase a total length of the magnetic tape accommodated in one reel of the magnetic tape cartridge. In order to increase the total length of the magnetic tape, it is necessary that the magnetic tape is thinned (hereinafter, referred to as "thinning").

In addition, in recent years, it is necessary that surface smoothness of a magnetic layer is increased in a magnetic tape. This is because an increase in surface smoothness of a magnetic layer causes improvement of electromagnetic conversion characteristics.

In consideration of these circumstances, the inventors have studied the application of a magnetic tape having a decreased total thickness and increased surface smoothness of a magnetic layer to a servo system. However, in such studies, it was clear that, a phenomenon which was not known in the related art occurred, in which a generation frequency of a signal defect during servo signal reproduction in a servo system increases, in a case where a total thickness of the magnetic tape is decreased and surface smoothness of a magnetic layer is increased. An example of such a signal defect is a signal defect called thermal asperity. The thermal asperity is a fluctuation of a reproduced waveform occurred due to a change in resistance value of an magnetoresistive (MR) element caused by occurrence of a local temperature change in the MR element, in a system including an MR head in which the MR element is mounted. In a case where a signal defect is generated during servo signal reproduction, it is difficult to perform head tracking at the portion where the signal defect is generated. Accordingly, it is necessary to decrease the generation frequency of a signal defect during servo signal reproduction, in order to more correctly record information on the magnetic tape and/or more correctly reproduce information recorded on the magnetic tape by using the servo system.

An aspect of the invention can decrease a generation frequency of a signal defect in a servo system, in a magnetic tape having a decreased total thickness and increased surface smoothness of a magnetic layer.

According to one aspect of the invention, there is provided a magnetic tape comprising: a non-magnetic support; and a magnetic layer including ferromagnetic powder and a binding agent on the non-magnetic support, in which a magnetic tape total thickness is equal to or smaller than 5.30 μm, the magnetic layer has a servo pattern, a center line average surface roughness Ra measured regarding a surface of the magnetic layer (hereinafter, also referred to as a "magnetic layer surface roughness Ra") is equal to or smaller than 1.8 nm, the ferromagnetic powder is ferromagnetic hexagonal ferrite powder, an intensity ratio (Int(110)/Int(114); hereinafter, also referred to as "X-ray diffraction (XRD) intensity ratio) of a peak intensity Int(110) of a diffraction peak of a (110) plane with respect to a peak intensity Int(114) of a diffraction peak of a (114) plane of a hexagonal ferrite crystal structure obtained by an X-ray diffraction analysis of the magnetic layer by using an In-Plane method is 0.5 to 4.0, and a vertical direction squareness ratio of the magnetic tape is 0.65 to 1.00.

In one aspect, the vertical direction squareness ratio of the magnetic tape is 0.65 to 0.90.

In one aspect, the center line average surface roughness Ra measured regarding the surface of the magnetic layer may be 1.2 nm to 1.8 nm.

In one aspect, the magnetic tape total thickness may be 3.00 μm to 5.30 μm.

In one aspect, the magnetic tape may further comprise a non-magnetic layer including non-magnetic powder and a binding agent between the non-magnetic support and the magnetic layer.

In one aspect, the magnetic tape may further comprise a back coating layer including non-magnetic powder and a binding agent on a surface side of the non-magnetic support opposite to a surface side provided with the magnetic layer.

According to another aspect of the invention, there is provided a magnetic tape device comprising: the magnetic tape; a magnetic head; and a servo head.

In the specification, a "servo write head", a "servo head", and a "magnetic head" are disclosed as a head. The servo write head is a head which performs recording of a servo signal (that is, formation of a servo pattern). The servo head is a head which performs reproducing of a servo signal (that is, reading of a servo pattern), and a magnetic head is a head which performs recording and/or reproducing of information.

According to one aspect of the invention, it is possible to provide a magnetic tape that is thinned and has a servo pattern in a magnetic layer having high surface smoothness, a magnetic tape in which a generation frequency of a signal defect during servo signal reproduction in a servo system is decreased, and a magnetic tape device which records a magnetic signal on this magnetic tape and/or reproduces the magnetic signal.

DESCRIPTION OF THE PREFERRED EMBODIMENTS

Magnetic Tape

Figure 1:
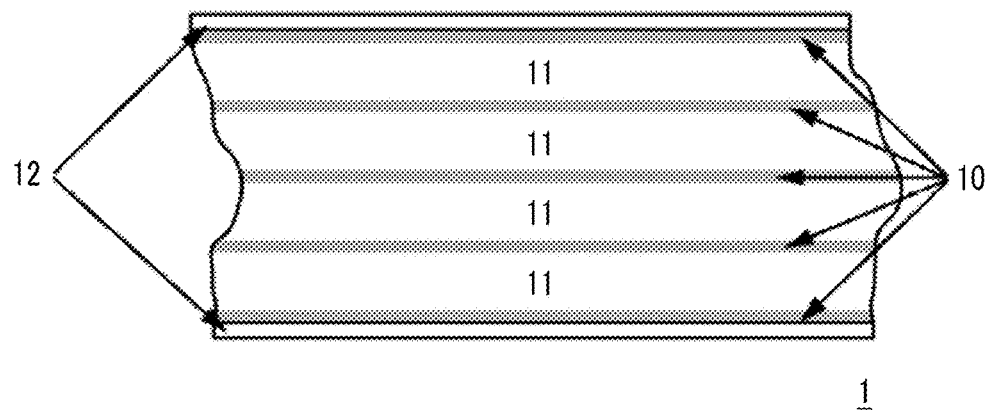
FIG. 1 shows an example of disposition of data bands and servo bands.

One aspect of the invention relates to a magnetic tape including: a non-magnetic support; and a magnetic layer including ferromagnetic powder and a binding agent on the non-magnetic support, in which a magnetic tape total thickness is equal to or smaller than 5.30 μm, the magnetic layer has a servo pattern, a center line average surface roughness Ra measured regarding a surface of the magnetic layer (magnetic layer surface roughness Ra) is equal to or smaller than 1.8 nm, the ferromagnetic powder is ferromagnetic hexagonal ferrite powder, an intensity ratio (Int(110)/Int (114)) of a peak intensity Int(110) of a diffraction peak of a (110) plane with respect to a peak intensity Int(114) of a diffraction peak of a (114) plane of a hexagonal ferrite crystal structure obtained by an X-ray diffraction analysis of the magnetic layer by using an In-Plane method is 0.5 to 4.0, and a vertical direction squareness ratio of the magnetic tape is 0.65 to 1.00.

Hereinafter, the magnetic tape will be described more specifically. The following description includes a surmise of the inventors. The invention is not limited to such a surmise. In addition, hereinafter, exemplary description may be made with reference to the drawings. However, the invention is not limited to the exemplified aspects.

In the invention and the specification, the "surface of the magnetic layer" of the magnetic tape is identical to the surface of the magnetic tape on the magnetic layer side. In the invention and the specification, the "ferromagnetic hexagonal ferrite powder" means an aggregate of a plurality of ferromagnetic hexagonal ferrite particles. The ferromagnetic hexagonal ferrite particles are ferromagnetic particles having a hexagonal ferrite crystal structure. Hereinafter, particles (ferromagnetic hexagonal ferrite particles) configuring the ferromagnetic hexagonal ferrite powder are also referred to as "hexagonal ferrite particles" or simply "particles". The "aggregate" not only includes an aspect in which particles configuring the aggregate are directly in contact with each other, but also includes an aspect in which a binding agent, an additive, or the like is sandwiched between the particles. The points described above are also applied to various powders such as non-magnetic powder of the invention and the specification, in the same manner.

In the invention and the specification, the description regarding directions and angles (for example, vertical, orthogonal, parallel, and the like) includes a range of errors allowed in the technical field of the invention, unless otherwise noted. For example, the range of errors means a range of less than ±10° from an exact angle, and is preferably within ±5° and more preferably within ±3° from an exact angle.

Magnetic Layer Surface Roughness Ra

The center line average surface roughness Ra measured regarding the surface of the magnetic layer of the magnetic tape (magnetic layer surface roughness Ra) is equal to or smaller than 1.8 nm. In the magnetic tape in which the magnetic layer surface roughness Ra is equal to or smaller than 1.8 nm and the total thickness is equal to or smaller than 5.30 μm, a generation frequency of a signal defect during servo signal reproduction increases in a servo system, in a case where any measures are not prepared. With respect to this, in the magnetic tape which includes ferromagnetic hexagonal ferrite powder in the magnetic layer and in which the XRD intensity ratio and the vertical direction squareness ratio are in the ranges described above, it is possible to prevent generation of a signal defect during the servo signal reproduction, even in a case where the magnetic layer surface roughness Ra is equal to or smaller than 1.8 nm and the total thickness is equal to or smaller than 5.30 μm. A surmise of the inventors regarding this point will be described later. In addition, the magnetic tape having the magnetic layer surface roughness Ra equal to or smaller than 1.8 nm can exhibit excellent electromagnetic conversion characteristics. From a viewpoint of further improving electromagnetic conversion characteristics, the magnetic layer surface roughness Ra is preferably equal to or smaller than 1.7 nm and more preferably equal to or smaller than 1.6 nm. In addition, the magnetic layer surface roughness Ra can be, for example, equal to or greater than 1.2 nm or equal to or greater than 1.3 nm. However, low magnetic layer surface roughness Ra is preferable, from a viewpoint of improving electromagnetic conversion characteristics, and thus, the magnetic layer surface roughness Ra may be lower than the value exemplified above.

The center line average surface roughness Ra measured regarding the surface of the magnetic layer of the magnetic tape in the invention and the specification is a value measured with an atomic force microscope (AFM) in a region having an area of 40 µm×40 µm of the surface of the magnetic layer. As an example of the measurement conditions, the following measurement conditions can be used. The magnetic layer surface roughness Ra shown in examples which will be described later is a value obtained by the measurement under the following measurement conditions.

The measurement is performed regarding the region of 40 µm×40 µm of the area of the surface of the magnetic layer of the magnetic tape with an AFM (Nanoscope 4 manufactured by Veeco Instruments, Inc.) in a tapping mode. RTESP-300 manufactured by BRUKER is used as a probe, a scan speed (probe movement speed) is set as 40 µm/sec, and a resolution is set as 512 pixel×512 pixel.

The magnetic layer surface roughness Ra can be controlled by a well-known method. For example, the magnetic layer surface roughness Ra can be changed in accordance with the size of various powders included in the magnetic layer (for example, ferromagnetic hexagonal ferrite powder, non-magnetic powder which can be randomly included, and the like) or manufacturing conditions of the magnetic tape. Thus, by adjusting these, it is possible to obtain the magnetic tape having the magnetic layer surface roughness Ra equal to or smaller than 1.8 nm.

Servo Pattern

The magnetic tape has a servo pattern in the magnetic layer. The formation of the servo pattern on the magnetic layer is performed by magnetizing a specific position of the magnetic layer by a servo pattern recording head (also referred to as a "servo write head"). A shape of the servo pattern and disposition thereof in the magnetic layer for realizing the head tracking servo are well known. In regards to the servo pattern of the magnetic layer of the magnetic tape, a well-known technology can be used. For example, as a head tracking servo system, a timing-based servo system and an amplitude-based servo system are known. The servo pattern of the magnetic layer of the magnetic tape may be a servo pattern capable of allowing head tracking servo of any system. In addition, a servo pattern capable of allowing head tracking servo in the timing-based servo system and a servo pattern capable of allowing head tracking servo in the amplitude-based servo system may be formed in the magnetic layer.

Hereinafter, as one specific aspect of the head tracking servo, head tracking servo in the timing-based servo system will be described. However, the head tracking servo of the invention is not limited to the following specific aspect.

In the head tracking servo in the timing-based servo system. (hereinafter, referred to as a "timing-based servo"), a plurality of servo patterns having two or more different shapes are formed on a magnetic layer, and a position of a servo head is recognized by an interval of time in a case where the servo head has read two servo patterns having different shapes and an interval of time in a case where the servo head has read two servo patterns having the same shapes. The position of the magnetic head in the width direction of the magnetic tape is controlled based on the position of the servo head recognized as described above. In one aspect, the magnetic head, the position of which is controlled here, is a magnetic head (reproducing head) which reproduces information recorded on the magnetic tape, and in another aspect, the magnetic head is a magnetic head (recording head) which records information in the magnetic tape.

Figure 2:
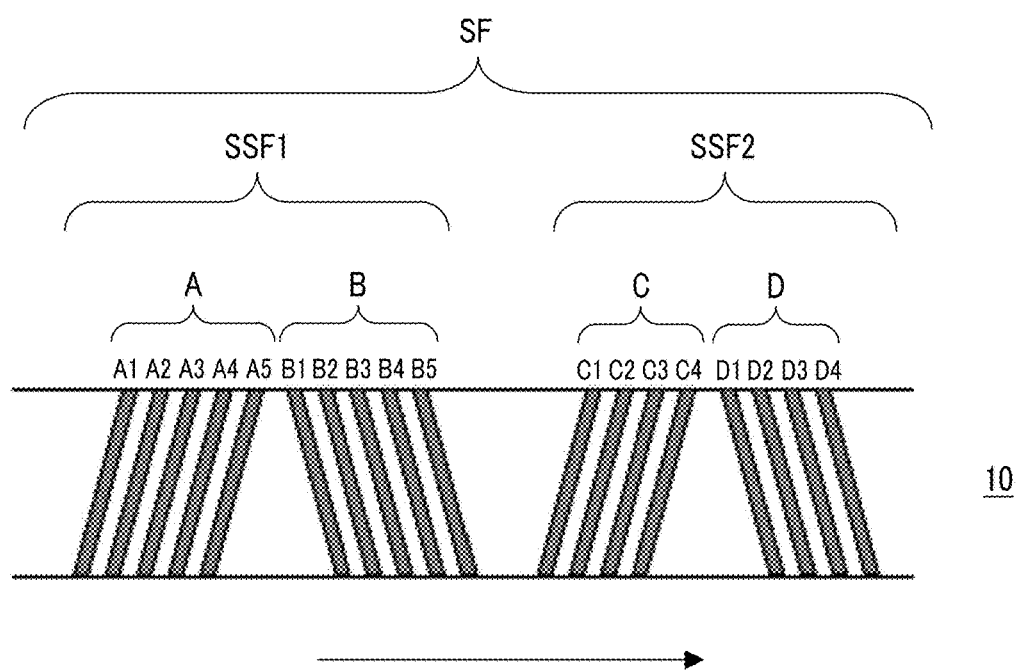
FIG. 2 shows a servo pattern disposition example of a linear-tape-open (LTO) Ultrium format tape.

FIG. 1 shows an example of disposition of data bands and servo bands. In FIG. 1, a plurality of servo bands 10 are disposed to be interposed between guide bands 12 in a magnetic layer of a magnetic tape 1. A plurality of regions 11 each of which is interposed between two servo bands are data bands. The servo pattern is a magnetized region and is formed by magnetizing a specific region of the magnetic layer by a servo write head. The region magnetized by the servo write head (position where a servo pattern is formed) is determined by standards. For example, in an LTO Ultrium format tape which is based on a local standard, a plurality of servo patterns tilted in a tape width direction as shown in FIG. 2 are formed on a servo band, in a case of manufacturing a magnetic tape. Specifically, in FIG. 2, a servo frame SF on the servo band 10 is configured with a servo sub-frame 1 (SSF1) and a servo sub-frame 2 (SSF2). The servo sub-frame 1 is configured with an A burst (in FIG. 2, reference numeral A) and a B burst (in FIG. 2, reference numeral B). The A burst is configured with servo patterns A1 to A5 and the B burst is configured with servo patterns B1 to B5. Meanwhile, the servo sub-frame 2 is configured with a C burst (in FIG. 2, reference numeral C) and a D burst (in FIG. 2, reference numeral D). The C burst is configured with servo patterns C1 to C4 and the D burst is configured with servo patterns D1 to D4. Such 18 servo patterns are disposed in the sub-frames in the arrangement of 5, 5, 4, 4, as the sets of 5 servo patterns and 4 servo patterns, and are used for recognizing the servo frames. FIG. 2 shows one servo frame for explaining. However, in practice, in the magnetic layer of the magnetic tape in which the head tracking servo in the timing-based servo system is performed, a plurality of servo frames are disposed in each servo band in a running direction. In FIG. 2, an arrow shows the running direction. For example, an LTO Ultrium format tape generally includes 5,000 or more servo frames per a tape length of 1 m, in each servo band of the magnetic layer. The servo head sequentially reads the servo patterns in the plurality of servo frames, while coming into contact with and sliding on the surface of the magnetic layer of the magnetic tape transported in the magnetic tape device.

In the head tracking servo in the timing-based servo system, a position of a servo head is recognized based on an interval of time in a case where the servo head has read the two servo patterns (reproduced servo signals) having different shapes and an interval of time in a case where the servo head has read two servo patterns having the same shapes. The time interval is normally obtained as a time interval of a peak of a reproduced waveform of a servo signal. For example, in the aspect shown in FIG. 2, the servo pattern of the A burst and the servo pattern of the C burst are servo patterns having the same shapes, and the servo pattern of the B burst and the servo pattern of the D burst are servo patterns having the same shapes. The servo pattern of the A burst and the servo pattern of the C burst are servo patterns having the shapes different from the shapes of the servo pattern of the B burst and the servo pattern of the D burst. An interval of the time in a case where the two servo patterns having different shapes are read by the servo head is, for example, an interval between the time in a case where any servo pattern of the A burst is read and the time in a case where any servo pattern of the B burst is read. An interval of the time in a case where the two servo patterns having the same shapes are read by the servo head is, for example, an interval between the time in a case where any servo pattern of the A burst is read and the time in a case where any servo pattern of the C burst is read. The head tracking servo in the timing-based servo system is a system supposing that occurrence of a deviation of the time interval is due to a position change of the magnetic tape in the width direction, in a case where the time interval is deviated from the set value. The set value is a time interval in a case where the magnetic tape runs without occurring the position change in the width direction. In the timing-based servo system, the magnetic head is moved in the width direction in accordance with a degree of the deviation of the obtained time interval from the set value. Specifically, as the time interval is greatly deviated from the set value, the magnetic head is greatly moved in the width direction. This point is applied to not only the aspect shown in FIGS. 1 and 2, but also to entire timing-based servo systems.

In the magnetic tape device using the timing-based servo system, for example, in a case where a signal defect is generated during servo signal reproduction, it is difficult to obtain a measurement result of an interval of time at a portion where the defect is generated (servo frame). As a result, in a case of causing the magnetic tape to run to perform recording or reproducing of a magnetic signal (information) by a magnetic head, it is partially difficult to perform positioning of a head by moving the magnetic head in a width direction. This is not limited to the timing-based servo system, and in a case where a signal defect is generated during the servo signal reproduction in a magnetic tape device using a servo system, it is partially difficult to perform positioning of a head by moving the magnetic head, in a case of causing the magnetic tape to run to perform recording or reproducing, of a magnetic signal (information) by a magnetic head.

In regards to the point described above, in the studies of the inventors, it is determined that, in the magnetic tape having the total thickness equal to or smaller than 5.30 μm and the magnetic layer surface roughness Ra equal to or smaller than 1.8 nm, a signal defect is significantly generated during the servo signal reproduction. The inventors have thought that a reason of generation of a signal defect during the servo signal reproduction is prevention of smooth sliding of the servo head and the surface of the magnetic layer (hereinafter, a deterioration in sliding properties). The inventors have surmised that different contact states of the servo head and the surface of the magnetic layer between the magnetic tape having the total thickness equal to or smaller than 5.30 μm and the magnetic layer surface roughness Ra equal to or smaller than 1.8 nm, and a magnetic tape of the related art, may be due to a decrease in sliding properties. However, this is merely a surmise.

With respect to this, as a result of intensive studies of the inventors, it is clear that the generation of a signal defect during the servo signal reproduction can be prevented by setting the XRD intensity ratio to be 0.5 to 4.0 and the vertical direction squareness ratio to be 0.65 to 1.00. A surmise of the inventors regarding this point will be described later.

XRD Intensity Ratio and Vertical Direction Squareness Ratio

Next, the XRD intensity ratio and the vertical direction squareness ratio will be described.

The magnetic tape includes ferromagnetic hexagonal ferrite powder in the magnetic layer. The inventors have surmised that particles affecting magnetic properties of the ferromagnetic hexagonal ferrite powder (aggregate of particles) (hereinafter, also referred to as "former particles") and particles which are considered not to affect or slightly affects the magnetic properties thereof (hereinafter, also referred to as "latter particles") are included in the ferromagnetic hexagonal ferrite powder included in the magnetic layer. It is considered that the latter particles are, for example, fine particles generated due to partial chipping of particles due to a dispersion process performed at the time of preparing a magnetic layer forming composition.

Meanwhile, the vertical direction squareness ratio is a ratio of residual magnetization with respect to saturation magnetization measured in a direction vertical to the surface of the magnetic layer and this value decreases, as a value of the residual magnetization decreases. It is surmised that, since the latter particles are fine and hardly hold magnetization, as a large amount of the latter particles is included in the magnetic layer, the vertical direction squareness ratio tends to decrease. Accordingly, the inventors have thought that the vertical direction squareness ratio may be an index for the amount of the latter particles (fine particles) present in the magnetic layer. In addition, the inventors have surmised that, as a large amount of the fine particles is included in the magnetic layer, hardness of the magnetic layer is decreased, and scraps generated due to chipping of the surface of the magnetic layer during the sliding of the surface of the magnetic layer and the servo head is interposed between the surface of the magnetic layer and the servo head, and accordingly, smooth sliding of the servo head and the surface of the magnetic layer is prevented. With respect to this, the inventors have thought that, in the magnetic layer having the vertical direction squareness ratio of 0.65 to 1.00, chipping due to the sliding with the servo head which hardly occurs by decreasing the presence amount of the latter particles (fine particles) causes promotion of smooth sliding of the servo head and the surface of the magnetic layer.

In addition, the inventors have thought that the surface of the magnetic layer which is suitably deformed during sliding of the servo head and the surface of the magnetic layer causes promotion of smooth sliding of the servo head and the surface of the magnetic layer. Meanwhile, the inventors have thought that, in the particles included in the ferromagnetic hexagonal ferrite powder included in the magnetic layer, the former particles are particles causing the diffraction peak in the X-ray diffraction analysis using the In-Plane method, and since the latter particles are fine, the latter particles do not or hardly affect the diffraction peak. Accordingly, it is surmised that it is possible to control a state of the particles affecting the magnetic properties of the ferromagnetic hexagonal ferrite powder present in the magnetic layer, based on the intensity of the diffraction peak caused by the X-ray diffraction analysis of the magnetic layer using the In-Plane method. The inventors have thought that the XRD intensity ratio is an index regarding this point. Specifically, the inventors have surmised that, as the XRD intensity ratio increases, a large number of the former particles present in a state where a direction orthogonal to the easy-magnetization axial direction is closer to a parallel state with respect to the surface of the magnetic layer is present in the magnetic layer, and as the XRD intensity ratio decreases, a small amount of the former particles present in such a state is present in the magnetic layer. In addition, the inventors have thought that, as a large amount of the former particles present in a state where a direction orthogonal to the easy-magnetization axial direction is closer to a parallel state with respect to the surface of the magnetic layer is present in the magnetic layer, a deformation amount of the deformation of the surface of the magnetic layer due to a contact with the servo head is small, and as the amount of the former particles of the former particles present in such a state is small, the deformation amount of the deformation of the surface of the magnetic layer due to a contact with the servo head increases. The inventors have surmised that the XRD intensity ratio of 0.5 to 4.0 causes suitable deformation of the surface of the magnetic layer due to a contact with the servo head, and as a result, it is possible to promote smooth sliding of the servo head and the surface of the magnetic layer.

As described above, it is surmised that the XRD intensity ratio of 0.5 to 4.0 and the vertical direction squareness ratio of 0.65 to 1.00 cause promotion of smooth sliding of the servo head and the surface of the magnetic layer. The inventors have thought that the promotion of the smooth sliding contributes to the prevention of generation of a signal defect during the servo signal reproduction.

However, this is merely a surmise and the invention is not limited thereto.

XRD Intensity Ratio

The XRD intensity ratio is obtained by the X-ray diffraction analysis of the magnetic layer including the ferromagnetic hexagonal ferrite powder by using the In-Plane method. Hereinafter, the X-ray diffraction analysis performed by using the In-Plane method is also referred to as "In-Plane XRD". The In-Plane XRD is performed by irradiating the surface of the magnetic layer with the X-ray by using a thin film X-ray diffraction device under the following conditions. A measurement direction is a longitudinal direction of the magnetic tape.

Cu ray source used (output of 45 kV, 200 mA)

Scan conditions: 0.05 degree/step, 0.1 degree/min in a range of 20 to 40 degrees Optical system used: parallel optical system Measurement method: $2\theta\chi$ scan (X-ray incidence angle of $0.25°$)

The values of the conditions are set values of the thin film X-ray diffraction device. As the thin film X-ray diffraction device, a well-known device can be used. As an example of the thin film X-ray diffraction device, Smart Lab manufactured by Rigaku Corporation. A sample to be subjected to the In-Plane XRD analysis is a tape sample cut out from the magnetic tape which is a measurement target, and the size and the shape thereof are not limited, as long as the diffraction peak which will be described later can be confirmed.

As a method of the X-ray diffraction analysis, thin film X-ray diffraction and powder X-ray diffraction are used. In the powder X-ray diffraction, the X-ray diffraction of the powder sample is measured, whereas, according to the thin film X-ray diffraction, the X-ray diffraction of a layer or the like formed on a substrate can be measured. The thin film X-ray diffraction is classified into the In-Plane method and an Out-Of-Plane method. The X-ray incidence angle at the time of the measurement is 5.00° to 90.00° in a case of the Out-Of-Plane method, and is generally 0.20° to 0.50°, in a case of the In-Plane method. In the In-Plane XRD of the invention and the specification, the X-ray incidence angle is 0.25° as described above. In the In-Plane method, the X-ray incidence angle is smaller than that in the Out-Of-Plane method, and thus, a depth of penetration of the X-ray is shallow. Accordingly, according to the X-ray diffraction analysis by using the In-Plane method (In-Plane XRD), it is possible to perform the X-ray diffraction analysis of a surface portion of a measurement target sample. Regarding the tape sample, according to the In-Plane XRD, it is possible to perform the X-ray diffraction analysis of the magnetic layer. The XRD intensity ratio is an intensity ratio (Int(110)/Int(114)) of a peak intensity Int(110) of a diffraction peak of a (110) plane with respect to a peak intensity Int(114) of a diffraction peak of a (114) plane of a hexagonal ferrite crystal structure, in X-ray diffraction spectra obtained by the In-Plane XRD. The term Int is used as abbreviation of intensity. In the X-ray diffraction spectra obtained by In-Plane XRD (vertical axis: intensity, horizontal axis: diffraction angle $2\theta\chi$ (degree)), the diffraction peak of the (114) plane is a peak at which the $2\theta\chi$ is detected at 33 to 36 degrees, and the diffraction peak of the (110) plane is a peak at which the $2\theta\chi$ is detected at 29 to 32 degrees.

Among the diffraction plane, the (114) plane having a hexagonal ferrite crystal structure is positioned close to particles (hexagonal ferrite particles) of the ferromagnetic hexagonal ferrite powder in an easy-magnetization axial direction (c axis direction). In addition the (110) plane having a hexagonal ferrite crystal structure is positioned in a direction orthogonal to the easy-magnetization axial direction.

The inventors have surmised that, in the X-ray diffraction spectra obtained by the In-Plane XRD, as the intensity ratio (Int(110)/Int(114); XRD intensity ratio) of the peak intensity Int(110) of the diffraction peak of a (110) plane with respect to the peak intensity Int(114) of the diffraction peak of the (114) plane of a hexagonal ferrite crystal structure increases, a large number of the former particles present in a state where a direction orthogonal to the easy-magnetization axial direction is closer to a parallel state with respect to the surface of the magnetic layer is present in the magnetic layer, and as the XRD intensity ratio decreases, a small amount of the former particles present in such a state is present in the magnetic layer. It is thought that a state where the XRD intensity ratio is 0.5 to 4.0 means a state where the former particles are suitably aligned in the magnetic layer. It is surmised that this causes the promotion of the smooth sliding of the servo head and the surface of the magnetic layer. The inventors have thought that the promotion of the smooth sliding contributes to the prevention of the generation of a signal defect during the servo signal reproduction.

The XRD intensity ratio is preferably equal to or smaller than 3.5 and more preferably equal to or smaller than 3.0, from a viewpoint of further preventing the generation of a signal defect during the servo signal reproduction. From the same viewpoint, the XRD intensity ratio is preferably equal to or greater than 0.7 and more preferably equal to or greater than 1.0. The XRD intensity ratio can be, for example, controlled in accordance with process conditions of an alignment process performed in a manufacturing step of the magnetic tape. As the alignment process, the homeotropic alignment process is preferably performed. The homeotropic alignment process can be preferably performed by applying a magnetic field vertically to the surface of a coating layer of a magnetic layer forming composition in a wet state (undried state). As the alignment conditions are reinforced, the value of the XRD intensity ratio tends to increase. As the process conditions of the alignment process, magnetic field strength of the alignment process is used. The process conditions of the alignment process are not particularly limited. The process conditions of the alignment process may be set so as that the XRD intensity ratio of 0.5 to 4.0 can be realized. As an example, the magnetic field strength of the homeotropic alignment process can be 0.10 to 0.80 T or 0.10 to 0.60 T. As dispersibility of the ferromagnetic hexagonal ferrite powder in the magnetic layer forming composition increases, the value of the XRD intensity ratio tends to increase by the homeotropic alignment process.

Vertical Direction Squareness Ratio

The vertical direction squareness ratio is a squareness ratio measured regarding a magnetic tape in a vertical direction. The "vertical direction" described regarding the squareness ratio is a direction orthogonal to the surface of the magnetic layer. That is, regarding the magnetic tape, the vertical direction is a direction orthogonal to a longitudinal direction of the magnetic tape. The vertical direction squareness ratio is measured by using an oscillation sample type magnetic-flux meter. Specifically, the vertical direction squareness ratio of the invention and the specification is a value obtained by sweeping an external magnetic field in the magnetic tape at a measurement temperature of 23° C.±1° C. in the oscillation sample type magnetic-flux meter, under conditions of a maximum external magnetic field of 1194 kA/m (15 kOe) and a scan speed of 4.8 kA/m/sec (60 Oe/sec), and is a value after diamagnetic field correction. The measurement value is obtained as a value obtained by subtracting magnetization of a sample probe of the oscillation sample type magnetic-flux meter as background noise.

The vertical direction squareness ratio of the magnetic tape is equal to or greater than 0.65. The inventors have surmised that the vertical direction squareness ratio of the magnetic tape is an index for the presence amount of the latter particles (fine particles) described above. It is thought that, in the magnetic layer in which the vertical direction squareness ratio of the magnetic tape is equal to or greater than 0.65, the presence amount of such fine particles is small. It is surmised that this also causes the promotion of the smooth sliding of the servo head and the surface of the magnetic layer. The inventors have surmised that the promotion of the smooth sliding contributes to the prevention of the generation of a signal defect during the servo signal reproduction.

From a viewpoint of further preventing the generation of a signal defect during the servo signal reproduction, the vertical direction squareness ratio is preferably equal to or greater than 0.68, more preferably equal to or greater than 0.70, even more preferably equal to or greater than 0.73, and still more preferably equal to or greater than 0.75. In addition, in principle, a maximum value of the squareness ratio is 1.00. Accordingly, the vertical direction squareness ratio of the magnetic tape is equal to or smaller than 1.00. The vertical direction squareness ratio may be, for example, equal to or smaller than 0.95, equal to or smaller than 0.90, equal to or smaller than 0.87, or equal to or smaller than 0.85. It is thought that, a great value of the vertical direction squareness ratio is preferable, from a viewpoint of decreasing the amount of the latter particles (fine particles) in the magnetic layer and further preventing the generation of a signal defect during the servo signal reproduction. Therefore, the vertical direction squareness ratio may be greater than the value exemplified above.

The inventors have considered that, in order to set the vertical direction squareness ratio to be equal to or greater than 0.65, it is preferable to prevent occurrence of fine particles due to partial chipping of the particles in a preparation step of the magnetic layer forming composition. A specific method for preventing the occurrence of chipping will be described later.

Next, the magnetic layer and the like included in the magnetic tape will be described more specifically.

Magnetic Layer

Ferromagnetic Powder

The magnetic layer of the magnetic tape includes ferromagnetic hexagonal ferrite powder as ferromagnetic powder. Regarding the ferromagnetic hexagonal ferrite powder, a magnetoplumbite type (also referred to as an "M type"), a W type, a Y type, and a Z type are known as the crystal structure of the hexagonal ferrite. The ferromagnetic hexagonal ferrite powder included in the magnetic layer may have any crystal structure. In addition, an iron atom and a divalent metal atom are included in the crystal structure of the hexagonal ferrite, as constituent atoms. The divalent metal atom is a metal atom which may become divalent cations as ions, and examples thereof include a barium atom, a strontium atom, an alkaline earth metal atom such as calcium atom, and a lead atom. For example, the hexagonal ferrite including a barium atom as the divalent metal atom is a barium ferrite, and the hexagonal ferrite including a strontium atom is a strontium ferrite. In addition, the hexagonal ferrite may be a mixed crystal of two or more hexagonal ferrites. As an example of the mixed crystal, a mixed crystal of the barium ferrite and the strontium ferrite can be used.

As an index for a particle size of the ferromagnetic hexagonal ferrite powder, an activation volume can be used. The "activation volume" is a unit of magnetization reversal. Regarding the activation volume described in the invention and the specification, magnetic field sweep rates of a coercivity He measurement part at time points of 3 minutes and 30 minutes are measured by using an oscillation sample type magnetic-flux meter (measurement temperature: 23° C.±1° C.), and the activation volume is a value acquired from the following relational expression of He and an activation volume V.

$$Hc=2Ku/Ms\{1-[(kT/KuV)\ln(At/0.693)]^{1/2}\}$$

[In the expression, Ku: anisotropy constant, Ms: saturation magnetization, k: Boltzmann's constant, T: absolute temperature, V: activation volume, A: spin precession frequency, and t: magnetic field reversal time]

As a method for achieving high-density recording, a method of decreasing a particle size of ferromagnetic powder included in a magnetic layer and increasing a filling percentage of the ferromagnetic powder of the magnetic layer is used. From this viewpoint, the activation volume of the ferromagnetic hexagonal ferrite powder is preferably equal to or smaller than 2,500 $nm^3$, more preferably equal to or smaller than 2,300 $nm^3$, and even more preferably equal to or smaller than 2,000 $nm^3$. Meanwhile, from a viewpoint of stability of magnetization, the activation volume is, for example, preferably equal to or greater than 800 $nm^3$, more preferably equal to or greater than 1,000 $nm^3$, and even more preferably equal to or greater than 1,200 $nm^3$.

The shape of the particle configuring the ferromagnetic hexagonal ferrite powder is specified by imaging the ferromagnetic hexagonal ferrite powder at a magnification ratio of 100,000 with a transmission electron microscope, and tracing an outline of a particle (primary particle) with a digitizer on a particle image obtained by printing the image on printing paper so that the total magnification of 500,000. The primary particle is an independent particle which is not aggregated. The imaging with a transmission electron microscope is performed by a direct method with a transmission electron microscope at an acceleration voltage of 300 kV. The transmission electron microscope observation and measurement can be, for example, performed with a transmission electron microscope H-9000 manufactured by Hitachi, Ltd. and image analysis software KS-400 manufactured by Carl Zeiss. Regarding the shape of the particle configuring the ferromagnetic hexagonal ferrite powder, a "planar shape" is a shape having two plate surfaces facing each other. Meanwhile, among the shapes of the particles not having such a plate surface, a shape having distinguished long axis and short axis is an "elliptical shape". The long axis is determined as an axis (linear line) having the longest length of the particle. In contrast, the short axis is determined as an axis having the longest length of the particle in a linear line orthogonal to the long axis. A shape not having distinguished long axis and short axis, that is, a shape in which the length of the long axis is the same as the length of the short axis is a "sphere shape". From the shapes, a shape in which the long axis and the short axis are hardly specified, is called an undefined shape. The imaging with a transmission electron microscope for specifying the shapes of the particles is performed without performing the alignment process with respect to the imaging target powder. The shape of the ferromagnetic hexagonal ferrite powder used for the preparation of the magnetic layer forming composition and the ferromagnetic hexagonal ferrite powder included in the magnetic layer may be any one of the planar shape, the elliptical shape, the sphere shape, and the undefined shape.

An average particle size of various powders disclosed in the invention and the specification is an arithmetical mean of the values obtained regarding randomly extracted 500 particles by using the particle image which is captured as described above. The average particle size shown in the examples which will be described later is a value obtained by using transmission electron microscope H-9000 manufactured by Hitachi, Ltd. as the transmission electron microscope and image analysis software KS-400 manufactured by Carl Zeiss as the image analysis software.

For details of the ferromagnetic hexagonal ferrite powder, descriptions disclosed in paragraphs 0134 to 0136 of JP2011-216149A can be referred to, for example.

The content (filling percentage) of the ferromagnetic hexagonal ferrite powder of the magnetic layer is preferably 50% to 90% by mass and more preferably 60% to 90% by mass. The component other than the ferromagnetic hexagonal ferrite powder of the magnetic layer is at least a binding agent, and one or more kinds of additives can be randomly included. A high filling percentage of the ferromagnetic hexagonal ferrite powder of the magnetic layer is preferable, from a viewpoint of improving recording density.

Binding Agent

The magnetic tape is a coating type magnetic tape, and the magnetic layer includes a binding agent together with the ferromagnetic hexagonal ferrite powder. As the binding agent, one or more kinds of resin is used. The resin may be a homopolymer or a copolymer. As the binding agent, various resins normally used as a binding agent of the coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins can be used as the binding agent even in the non-magnetic layer and/or a back coating layer which will be described later. For the binding agent described above, description disclosed in paragraphs 0028 to 0031 of JP2010-24113A can be referred to. An average molecular weight of the resin used as the binding agent can be, for example, 10,000 to 200,000 as a weight-average molecular weight.

The weight-average molecular weight of the invention and the specification is a value obtained by performing polystyrene conversion of a value measured by gel permeation chromatography (GPC). As the measurement conditions, the following conditions can be used. The weight-average molecular weight shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In addition, a curing agent can also be used together with the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of hardness of each layer such as the magnetic layer.

Other Components

The magnetic layer may include one or more kinds of additives, if necessary, together with the various components described above. As the additives, a commercially available product can be suitably selected and used according to the desired properties. Alternatively, a compound synthesized by a well-known method can be used as the additives. As the additives, the curing agent described above is used as an example. In addition, examples of the additive which can be included in the magnetic layer include a non-magnetic filler, a lubricant, a dispersing agent, a dispersing assistant, an antibacterial agent, an antistatic agent, an antioxidant, and carbon black. The non-magnetic filler is identical to the non-magnetic powder. As the non-magnetic filler, a non-magnetic filler (hereinafter, referred to as a "projection formation agent") which can function as a projection formation agent which forms projections suitably protruded from the surface of the magnetic layer, and a non-magnetic filler (hereinafter, referred to as an "abrasive") which can function as an abrasive can be used.

Non-Magnetic Filler

As the projection formation agent which is one aspect of the non-magnetic filler, various non-magnetic powders normally used as a projection formation agent can be used. These may be inorganic substances or organic substances. In one aspect, from a viewpoint of homogenization of friction properties, particle size distribution of the projection formation agent is not polydispersion having a plurality of peaks in the distribution and is preferably monodisperse showing a single peak. From a viewpoint of availability of monodisperse particles, the projection formation agent is preferably powder of inorganic substances (inorganic powder). Examples of the inorganic powder include powder of inorganic oxide such as metal oxide, metal carbonate, metal sulfate, metal nitride, metal carbide, and metal sulfide, and powder of inorganic oxide is preferable. The projection formation agent is more preferably colloid particles and even more preferably inorganic oxide colloid particles. In addition, from a viewpoint of availability of monodisperse particles, the inorganic oxide configuring the inorganic oxide colloid particles are preferably silicon dioxide (silica). The inorganic oxide colloid particles are more preferably colloidal silica (silica colloid particles). In the invention and the specification, the "colloid particles" are particles which are not precipitated and dispersed to generate a colloidal dispersion, in a case where 1 g of the particles is added to 100 mL of at least one organic solvent of at least methyl ethyl ketone, cyclohexanone, toluene, or ethyl acetate, or a mixed solvent including two or more kinds of the solvent described above at a random mixing ratio. In addition, in another aspect, the projection formation agent is preferably carbon black.

An average particle size of the projection formation agent is, for example, 30 to 300 nm and is preferably 40 to 200 nm.

The abrasive which is another aspect of the non-magnetic filler is preferably non-magnetic powder having Mohs hardness exceeding 8 and more preferably non-magnetic powder having Mohs hardness equal to or greater than 9. A maximum value of Mohs hardness is 10 of diamond. Specifically, powders of alumina ($Al_2O_3$), silicon carbide, boron carbide ($B_4C$), $SiO_2$, TiC, chromium oxide ($Cr_2O_3$), cerium oxide, zirconium oxide ($ZrO_2$), iron oxide, diamond, and the like can be used, and among these, alumina powder such as α-alumina and silicon carbide powder are preferable. In addition, regarding the particle size of the abrasive, a specific surface area which is an index for the particle size is, for example, equal to or greater than 14 $m^2/g$, and is preferably 16 $m^2/g$ and more preferably 18 $m^2/g$. Further, the specific surface area of the abrasive can be, for example, equal to or smaller than 40 $m^2/g$. The specific surface area is a value obtained by a nitrogen adsorption method (also referred to as a Brunauer-Emmett-Teller (BET) 1 point method), and is a value measured regarding primary particles. Hereinafter, the specific surface area obtained by such a method is also referred to as a BET specific surface area.

In addition, from a viewpoint that the projection formation agent and the abrasive can exhibit the functions thereof in more excellent manner, the content of the projection formation agent in the magnetic layer is preferably 1.0 to 4.0 parts by mass and more preferably 1.5 to 3.5 parts by mass with respect to 100.0 parts by mass of the ferromagnetic hexagonal ferrite powder. Meanwhile, the content of the abrasive in the magnetic layer is preferably 1.0 to 20.0 parts by mass, more preferably 3.0 to 15.0 parts by mass, and even more preferably 4.0 to 10.0 parts by mass with respect to 100.0 parts by mass of the ferromagnetic hexagonal ferrite powder.

As an example of the additive which can be used in the magnetic layer including the abrasive, a dispersing agent disclosed in paragraphs 0012 to 0022 of JP2013-131285A can be used as a dispersing agent for improving dispersibility of the abrasive of the magnetic layer forming composition. It is preferable to improve dispersibility of the magnetic layer forming composition of the non-magnetic filler such as an abrasive, in order to decrease the magnetic layer surface roughness Ra.

In addition, as the dispersing agent, a well-known dispersing agent such as a carboxy group-containing compound or a nitrogen-containing compound can be used. For example, the nitrogen-containing compound may be any of a primary amine represented by $NH_2R$, a secondary amine represented by $NHR_2$, and a tertiary amine represented by $NR_3$. In the above description, R represents a random structure configuring the nitrogen-containing compound, and a plurality of Rs may be the same as each other or different from each other. The nitrogen-containing compound may be a compound (polymer) having a plurality of repeating structure in a molecule. The inventors have thought that a nitrogen-containing part of the nitrogen-containing compound which functions as an adsorption part to the surface of the particle of the ferromagnetic hexagonal ferrite powder is a reason why the nitrogen-containing compound can function as the dispersing agent. As the carboxy group-containing compound, fatty acid such as oleic acid can be used, for example. The inventors have thought that a carboxy group which functions as an adsorption part to the surface of the particle of the ferromagnetic hexagonal ferrite powder is a reason why the carboxy group-containing compound can function as the dispersing agent. It is also preferable to use the carboxy group-containing compound and the nitrogen-containing compound in combination.

Non-Magnetic Layer

Next, the non-magnetic layer will be described. The magnetic tape may directly include a magnetic layer on a non-magnetic support, or may include a non-magnetic layer including non-magnetic powder and a binding agent between the non-magnetic support and the magnetic layer. The non-magnetic powder used in the non-magnetic layer may be powder of inorganic substances or powder of organic substances. In addition, carbon black and the like can be used. Examples of the inorganic substance include metal, metal oxide, metal carbonate, metal sulfate, metal nitride, metal carbide, and metal sulfide. These non-magnetic powders can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably 50% to 90% by mass and more preferably 60% to 90% by mass.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the invention and the specification also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or thermal treatment may be performed with respect to these supports in advance.

Back Coating Layer

The magnetic tape can also include a back coating layer including non-magnetic powder and a binding agent on a surface side of the non-magnetic support opposite to the surface including the magnetic layer. The back coating layer preferably includes any one or both of carbon black and inorganic powder. In regards to the binding agent included in the back coating layer and various additives which can be randomly included in the back coating layer, a well-known technology regarding the treatment of the magnetic layer and/or the non-magnetic layer can be applied.

Magnetic Tape Total Thickness

A total thickness of the magnetic tape is equal to or smaller than 5.30 μm. It is preferable that the total thickness is small (thinning is realized), in order to increase recording capacity per one reel of a magnetic tape cartridge. The total thickness of the magnetic tape may be, for example, equal to or smaller than 5.20 μm, equal to or smaller than 5.10 μm, or equal to or smaller than 5.00 μm. In addition, from a viewpoint of ease of handling (handleability) of the magnetic tape, the total thickness of the magnetic tape is, for example, preferably equal to or greater than 1.00 μm, more preferably equal to or greater than 2.00 μm, even more preferably equal to or greater than 3.00 μm, and still more preferably equal to or greater than 4.00 μm.

Thickness of Non-Magnetic Support and Each Layer

The thickness of the non-magnetic support is preferably 3.00 to 4.50 μm. The thickness of the magnetic layer is preferably equal to or smaller than 0.15 μm and more preferably equal to or smaller than 0.10 μm, from a viewpoint of realizing recording at high density which is recently required. The thickness of the magnetic layer is more preferably 0.01 to 0.10 μm. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is the total thickness of the layers.

The thickness of the non-magnetic layer is, for example, 0.10 to 1.50 μm and preferably 0.10 to 1.00 μm.

A thickness of the back coating layer is preferably equal to or smaller than 0.90 μm and more preferably 0.10 to 0.70 μm.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scan electron microscope. In the cross section observation, various thicknesses can be acquired as a thickness acquired at one portion of the cross section in the thickness direction, or an arithmetical mean of thicknesses acquired at a plurality of portions of two or more portions, for example, two portions which are randomly extracted. In addition, the thickness of each layer may be acquired as a designed thickness calculated according to the manufacturing conditions.

Manufacturing Method

Manufacturing of Magnetic Tape in Which Servo Pattern is Formed

Preparation of Each Layer Forming Composition

Each composition for forming the magnetic layer, the non-magnetic layer, or the back coating layer normally includes a solvent, together with various components described above. As the solvent, various organic solvents generally used for manufacturing a coating type magnetic recording medium can be used. Among those, from a viewpoint of solubility of the binding agent normally used in the coating type magnetic recording medium, each layer forming composition preferably includes one or more ketone solvents such as acetone, methyl ethyl ketone, methyl isobutyl ketone, diisobutyl ketone, cyclohexanone, isophorone, and tetrahydrofuran. The amount of the solvent in each layer forming composition is not particularly limited, and can be set to be the same as that of each layer forming composition of a typical coating type magnetic recording medium. In addition, steps of preparing each layer forming composition generally include at least a kneading step, a dispersing step, and a mixing step provided before and after these steps, if necessary. Each step may be divided into two or more stages. All of raw materials used in the invention may be added at an initial stage or in a middle stage of each step. In addition, each raw material may be separately added in two or more steps. For example, a binding agent may be separately added in a kneading step, a dispersing step, and a mixing step for adjusting viscosity after the dispersion. In the manufacturing step of the magnetic tape, a well-known manufacturing technology of the related art can be used in a part or all of the steps. In the kneading step, an open kneader, a continuous kneader, a pressure kneader, or a kneader having a strong kneading force such as an extruder is preferably used. The details of the kneading processes of these kneaders are disclosed in JP1989-106338A (JP-H01-106338A) and JP1989-79274A (JP-H01-79274A). As a dispersing machine, a well-known dispersing machine can be used. Each layer forming composition may be filtered by a well-known method before performing the coating step. The filtering can be performed by using a filter, for example. As the filter used in the filtering, a filter having a hole diameter of 0.01 to 3 μm (for example, filter made of glass fiber or filter made of polypropylene) can be used, for example.

Regarding the dispersion process of the magnetic layer forming composition, it is preferable to prevent the occurrence of chipping as described above. In order to realize the prevention, it is preferable to perform the dispersion process of the ferromagnetic hexagonal ferrite powder by a dispersion process having two stages, in which a coarse aggregate of the ferromagnetic hexagonal ferrite powder is crushed by the dispersion process in a first stage, and the dispersion process in a second stage, in which a collision energy applied to particles of the ferromagnetic hexagonal ferrite powder due to collision with the dispersion beads is smaller than that in the first dispersion process, is performed, in the step of preparing the magnetic layer forming composition. According to such a dispersion process, it is possible to improve dispersibility of the ferromagnetic hexagonal ferrite powder and prevent the occurrence of chipping.

As a preferred aspect of the dispersion process having two stages, a dispersion process including a first stage of obtaining a dispersion liquid by performing the dispersion process of the ferromagnetic hexagonal ferrite powder, the binding agent, and the solvent under the presence of first dispersion beads, and a second stage of performing the dispersion process of the dispersion liquid obtained in the first stage under the presence of second dispersion beads having smaller bead diameter and density than those of the first dispersion beads can be used. Hereinafter, the dispersion process of the preferred aspect described above will be further described.

In order to increase the dispersibility of the ferromagnetic hexagonal ferrite powder, the first stage and the second stage are preferably performed as the dispersion process before mixing the ferromagnetic hexagonal ferrite powder and other powder components. For example, in a case of forming the magnetic layer including the non-magnetic filler, the first stage and the second stage are preferably performed as a dispersion process of a solution (magnetic liquid) including ferromagnetic hexagonal ferrite powder, a binding agent, a solvent, and randomly added additives, before mixing the non-magnetic filler.

A bead diameter of the second dispersion bead is preferably equal to or smaller than 1/100 and more preferably equal to or smaller than 1/500 of a bead diameter of the first dispersion bead. The bead diameter of the second dispersion bead can be, for example, equal to or greater than 1/10,000 of the bead diameter of the first dispersion bead. However, there is no limitation to this range. The bead diameter of the second dispersion bead is, for example, preferably 80 to 1,000 nm. Meanwhile, the bead diameter of the first dispersion bead can be, for example, 0.2 to 1.0 mm.

The bead diameter of the invention and the specification is a value measured by the same method as the measurement method of the average particle size of the powder described above.

The second stage is preferably performed under the conditions in which the amount of the second dispersion beads is equal to or greater than 10 times of the amount of the ferromagnetic hexagonal ferrite powder, and is more preferably performed under the conditions in which the amount of the second dispersion beads is 10 times to 30 times of the amount of the ferromagnetic hexagonal ferrite powder, based on mass.

Meanwhile, the amount of the dispersion beads in the first stage is preferably in the range described above.

The second dispersion beads are beads having lower density than that of the first dispersion beads. The "density" is obtained by dividing the mass (unit: g) of the dispersion beads by volume (unit: $cm^3$). The measurement is performed by the Archimedes method. The density of the second dispersion beads is preferably equal to or lower than 3.7 $g/cm^3$ and more preferably equal to or lower than 3.5 $g/cm^3$. The density of the second dispersion beads may be, for example, equal to or higher than 2.0 $g/cm^3$ or may be lower than 2.0 $g/cm^3$. As the preferred second dispersion beads from a viewpoint of density, diamond beads, silicon carbide beads, or silicon nitride beads can be used, and as preferred second dispersion beads from a viewpoint of density and hardness, diamond beads can be used.

Meanwhile, as the first dispersion beads, dispersion beads having density exceeding 3.7 $g/cm^3$ are preferable, dispersion beads having density equal to or higher than 3.8 $g/cm^3$ are more preferable, and dispersion beads having density equal to or higher than 4.0 $g/cm^3$ are even more preferable. The density of the first dispersion beads may be, for example, equal to or smaller than 7.0 $g/cm^3$ or may exceed 7.0 $g/cm^3$. As the first dispersion beads, zirconia beads or alumina beads are preferably used, and zirconia beads are more preferably used.

The dispersion time is not particularly limited and may be set in accordance with the kind of a dispersing machine used.

Coating Step

The magnetic layer can be formed by directly applying the magnetic layer forming composition onto the surface of the non-magnetic support or performing multilayer coating of the magnetic layer forming composition with the non-magnetic layer forming composition in order or at the same time. The back coating layer can be formed by applying the back coating layer forming composition to the surface side of the non-magnetic support opposite to a surface side provided with the magnetic layer (or to be provided with the magnetic layer). For details of the coating for forming each layer, a description disclosed in a paragraph 0066 of JP2010-231843A can be referred to.

Other Steps

For details of various other steps for manufacturing the magnetic tape, descriptions disclosed in paragraphs 0067 to 0070 of JP2010-231843A can be referred to. It is preferable that the coating layer of the magnetic layer forming composition is subjected to an alignment process, while the coating layer is wet (not dried). For the alignment process, various well-known technologies such as a description disclosed in a paragraph 0067 of JP2010-231843A can be used without any limitation. As described above, it is preferable to perform the homeotropic alignment process as the alignment process, from a viewpoint of controlling the XRD intensity ratio. Regarding the alignment process, the above description can also be referred to.

As described above, it is possible to obtain a magnetic tape included in the magnetic tape device according to one aspect of the invention. However, the manufacturing method described above is merely an example, the XRD intensity ratio and the vertical direction squareness ratio can be controlled to be in respective ranges described above by a random method capable of adjusting the XRD intensity ratio and the vertical direction squareness ratio, and such an aspect is also included in the invention.

Formation of Servo Pattern

The magnetic tape has a servo pattern in the magnetic layer. Details of the servo pattern is as described above. For example, FIG. 1 shows a disposition example of a region (servo band) in which the timing-based servo pattern is formed and a region (data band) interposed between two servo bands. FIG. 2 shows a disposition example of the timing-based servo patterns. Here, the disposition example shown in each drawing is merely an example, and the servo pattern, the servo bands, and the data bands may be formed and disposed in the disposition according to a system of the magnetic tape device (drive). In addition, for the shape and the disposition of the timing-based servo pattern, a well-known technology such as disposition examples shown in FIG. 4, FIG. 5, FIG. 6, FIG. 9, FIG. 17, and FIG. 20 of U.S. Pat. No. 5,689,384A can be applied, for example.

The servo pattern can be formed by magnetizing a specific region of the magnetic layer by a servo write head mounted on a servo writer. A region to be magnetized by the servo write head (position where the servo pattern is formed) is determined by standards. As the servo writer, a commercially available servo writer or a servo writer having a well-known configuration can be used. For the configuration of the servo writer, well-known technologies such as technologies disclosed in JP2011-175687A, U.S. Pat. Nos. 5,689,384A, and 6,542,325B can be referred to.

The magnetic tape is generally accommodated in a magnetic tape cartridge and the magnetic tape cartridge is mounted in the magnetic tape device. In the magnetic tape cartridge, the magnetic tape is generally accommodated in a cartridge main body in a state of being wound around a reel. The reel is rotatably provided in the cartridge main body. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic tape device (drive) in order to record and/or reproduce information (magnetic signals) to the magnetic tape, the magnetic tape is drawn from the magnetic tape cartridge and wound around the reel on the drive side. A magnetic head is disposed on a magnetic tape transportation path from the magnetic tape cartridge to a winding reel. Sending and winding of the magnetic tape are performed between a reel (supply reel) on the magnetic tape cartridge side and a reel (winding reel) on the drive side. In the meantime, the magnetic head comes into contact with and slides on the surface of the magnetic layer of the magnetic tape, and accordingly, the recording and/or reproduction of the magnetic signal is performed. With respect to this, in the twin reel type magnetic tape cartridge, both reels of the supply reel and the winding reel are provided in the magnetic tape cartridge. The magnetic tape according to one aspect of the invention may be accommodated in any of single reel type magnetic tape cartridge and twin reel type magnetic tape cartridge. The configuration of the magnetic tape cartridge is well known.

The magnetic tape according to one aspect of the invention described above is a magnetic tape in which a total thickness is decreased to be equal to or smaller than 5.30 μm, has high surface smoothness with the magnetic layer surface roughness Ra equal to or smaller than 1.8 nm, and can prevent the generation of a signal defect during the servo signal reproduction in the servo system.

Magnetic Tape Device

One aspect of the invention relates to a magnetic tape device including the magnetic tape, a magnetic head, and a servo head.

The details of the magnetic tape mounted on the magnetic tape device are as described above. Such a magnetic tape includes servo patterns. Accordingly, a magnetic signal is recorded on the data band by the magnetic head to form a data track, and/or, in a case of reproducing the recorded signal, head tracking is performed based on the read servo pattern, while reading the servo pattern by the servo head, and therefore, it is possible to cause the magnetic head to follow the data track at a high accuracy.

As the magnetic head mounted on the magnetic tape device, a well-known magnetic head which can perform the recording and/or reproducing of the magnetic signal with respect to the magnetic tape can be used. A recording head and a reproduction head may be one magnetic head or may be separated magnetic heads. As the servo head, a well-known servo head which can read the timing-based servo pattern of the magnetic tape can be used. At least one or two or more servo heads may be included in the magnetic tape device. In addition, a servo pattern reading element may be included in a magnetic head including an element for recording a magnetic signal and/or an element for the reproducing. That is, the magnetic head and the servo head may be a single head.

For details of the head tracking servo of the timing-based servo system, for example, well-known technologies such as technologies disclosed in U.S. Pat. Nos. 5,689,384A, 6,542,325B, and 7,876,521B can be used. In addition, for the details of the head tracking servo in the amplitude-based servo system, well-known technologies disclosed in U.S. Pat. Nos. 5,426,543A and 5,898,533A can be used.

A commercially available magnetic tape device generally includes a magnetic head and a servo head in accordance to a standard. In addition, a commercially available magnetic tape device generally has a servo controlling mechanism for realizing head tracking of the servo system in accordance to a standard. The magnetic tape device according to one aspect of the invention can be configured by incorporating the magnetic tape according to one aspect of the invention to a commercially available magnetic tape device.

EXAMPLES

Hereinafter, the invention will be described with reference to examples. However, the invention is not limited to aspects shown in the examples. "Parts" and "%" in the following description mean "parts by mass" and "% by mass", unless otherwise noted. In addition, steps and evaluations described below are performed in an environment of an atmosphere temperature of 23° C.±1° C., unless otherwise noted.

1. Manufacturing of Magnetic Tape

Example 1

A list of each layer forming composition is shown below.
List of Magnetic Layer Forming Composition
Magnetic Liquid
Plate-shaped ferromagnetic hexagonal ferrite powder (M-type barium ferrite): 100.0 parts
(Activation volume: 1,500 nm$^3$)
Oleic acid: 2.0 parts
A vinyl chloride copolymer (MR-104 manufactured by Zeon Corporation): 10.0 parts
SO$_3$Na group-containing polyurethane resin: 4.0 parts
(Weight-average molecular weight: 70,000, SO$_3$Na group: 0.07 meq/g)
An amine-based polymer (DISPERBYK-102 manufactured by BYK Additives & Instruments): 6.0 parts
Methyl ethyl ketone: 150.0 parts
Cyclohexanone: 150.0 parts
Abrasive Solution
α-alumina: 6.0 parts
(BET specific surface area: 19 m$^2$/g, Mohs hardness: 9)
SO$_3$Na group-containing polyurethane resin: 0.6 parts
(Weight-average molecular weight: 70,000, SO$_3$Na group: 0.1 meq/g)
2,3-Dihydroxynaphthalene: 0.6 parts
Cyclohexanone: 23.0 parts
Projection Forming Agent Liquid
Colloidal silica: 2.0 parts
(Average particle size: 80 nm)
Methyl ethyl ketone: 8.0 parts
Lubricant and Curing Agent Liquid
Stearic acid: 3.0 parts
Stearic acid amide: 0.3 parts
Butyl stearate: 6.0 parts
Methyl ethyl ketone: 110.0 parts
Cyclohexanone: 110.0 parts
Polyisocyanate (CORONATE (registered trademark) L manufactured by Tosoh Corporation): 3.0 parts
List of Non-Magnetic Layer Forming Composition
Non-magnetic inorganic powder: α-iron oxide: 100.0 parts
(Average particle size: 10 nm, BET specific surface area: 75 m$^2$/g)
Carbon black: 25.0 parts
(Average particle size: 20 nm)

A SO$_3$Na group-containing polyurethane resin: 18.0 parts
(Weight-average molecular weight: 70,000, content of SO$_3$Na group: 0.2 meq/g)
Stearic acid: 1.0 parts
Cyclohexanone: 300.0 parts
Methyl ethyl ketone: 300.0 parts
List of Back Coating Layer Forming Composition
Non-magnetic inorganic powder: α-iron oxide: 80.0 parts
(Average particle size: 0.15 µm, BET specific surface area: 52 m$^2$/g)
Carbon black: 20.0 parts
(Average particle size: 20 nm)
A vinyl chloride copolymer: 13.0 parts
A sulfonic acid group-containing polyurethane resin: 6.0 parts
Phenylphosphonic acid: 3.0 parts
Cyclohexanone: 155.0 parts
Methyl ethyl ketone: 155.0 parts
Stearic acid: 3.0 parts
Butyl stearate: 3.0 parts
Polyisocyanate: 5.0 parts
Cyclohexanone: 200.0 parts
Preparation of Magnetic Layer Forming Composition
The magnetic layer forming composition was prepared by the following method.

A dispersion liquid A was prepared by dispersing (first stage) various components of the magnetic liquid with a batch type vertical sand mill by using zirconia beads having a bead diameter of 0.5 mm (first dispersion beads, density of 6.0 g/cm$^3$) for 24 hours, and then performing filtering with a filter having a hole diameter of 0.5 µm. The used amount of zirconia beads was 10 times of the amount of the ferromagnetic hexagonal ferrite powder based on mass.

After that, a dispersion liquid (dispersion liquid B) was prepared by dispersing (second stage) dispersion liquid A with a batch type vertical sand mill by using diamond beads having a bead diameter shown in Table 1 (second dispersion beads, density of 3.5 g/cm$^3$) for 1 hour, and then separating diamond beads by using a centrifugal separator. The magnetic liquid is the dispersion liquid B obtained as described above. The used amount of diamond beads was 10 times of the amount of the ferromagnetic hexagonal ferrite powder based on mass.

Regarding the abrasive solution, various components of the abrasive solution were mixed with each other and put in a transverse beads mill disperser together with zirconia beads having a bead diameter of 0.3 mm, so as to perform the adjustment so that a value of bead volume/(abrasive solution volume+bead volume) was 80%, the beads mill dispersion process was performed for 120 minutes, the liquid after the process was extracted, and an ultrasonic dispersion filtering process was performed by using a flow type ultrasonic dispersion filtering device. By doing so, the abrasive solution was prepared.

The magnetic layer forming composition was prepared by introducing the prepared magnetic liquid, the abrasive solution, the projection formation agent solution, and the lubricant and curing agent solution in a dissolver, stirring the mixture at a circumferential speed of 10 m/sec for 30 minutes, and performing a process of 3 passes at a flow rate of 7.5 kg/min with a flow type ultrasonic disperser, and filtering the mixture with a filter having a hole diameter of 1 µm.

The activation volume of the ferromagnetic hexagonal ferrite powder described above is a value calculated by performing measurement by using powder which is the same powder lot as the ferromagnetic hexagonal ferrite powder used in the preparation of the magnetic layer forming composition. The magnetic field sweep rates in the coercivity He measurement part at timing points of 3 minutes and 30 minutes were measured by using an oscillation sample type magnetic-flux meter (manufactured by Toei Industry Co., Ltd.), and the activation volume was calculated from the relational expression described above. The measurement was performed in the environment of 23° C.±1° C.

Preparation of Non-Magnetic Layer Forming Composition

A non-magnetic layer forming composition was prepared by dispersing various components of the non-magnetic layer forming composition with a batch type vertical sand mill by using zirconia beads having a bead diameter of 0.1 mm for 24 hours, and then performing filtering with a filter having a hole diameter of 0.5 µm.

Preparation of Back Coating Layer Forming Composition

Components among various components of the back coating layer forming composition except a lubricant (stearic acid and butyl stearate), polyisocyanate, and 200.0 parts of cyclohexanone were kneaded and diluted by an open kneader, and subjected to a dispersion process of 12 passes, with a transverse beads mill disperser and zirconia beads having a bead diameter of 1 mm, by setting a bead filling percentage as 80 volume %, a circumferential speed of rotor distal end as 10 m/sec, and a retention time for 1 pass as 2 minutes. After that, the remaining components were added and stirred with a dissolver, the obtained dispersion liquid was filtered with a filter having a hole diameter of 1 µm and a back coating layer forming composition was prepared.

Manufacturing Method of Magnetic Tape

The non-magnetic layer forming composition prepared as described above was applied to a surface of a support made of polyethylene naphthalate having a thickness shown in Table 1 so that the thickness after the drying becomes a thickness show in Table 1 and was dried to form a non-magnetic layer. The magnetic layer forming composition prepared as described above was applied onto the surface of the formed non-magnetic layer so that the thickness after the drying becomes a thickness shown in Table 1 and a coating layer was formed. A homeotropic alignment process was performed by applying a magnetic field having a strength shown in Table 1 in a vertical direction with respect to the surface of the coating layer, while the coating layer of the magnetic layer forming composition is wet (not dried). After that, the coating layer was dried to form a magnetic layer.

After that, the back coating layer forming composition prepared as described above was applied to the surface of the support opposite to the surface where the non-magnetic layer and the magnetic layer are formed, so that the thickness after the drying becomes a thickness shown in Table 1, and was dried.

A calender process (surface smoothing treatment) was performed with respect to the magnetic tape obtained as described above by a calender configured of only a metal roll, at a speed of 100 m/min, linear pressure of 300 kg/cm (294 kN/m), and by using a calender roll at a surface temperature shown in Table 1, and then, a heat treatment was performed in the environment of the atmosphere temperature of 70° C. for 36 hours. After the heat treatment, the slitting was performed to have a width of ½ inches (0.0127 meters), and a magnetic tape was obtained.

In a state where the magnetic layer of the obtained magnetic tape was demagnetized, servo patterns having disposition and shapes according to the LTO Ultrium format were formed on the magnetic layer by using a servo write head mounted on a servo writer. Accordingly, a magnetic tape of Example 1 including data bands, servo bands, and guide bands in the disposition according to the LTO Ultrium format in the magnetic layer, and including timing-based servo patterns having the disposition and the shape according to the LTO Ultrium format on the servo band was obtained.

Examples 2 to 6, Comparative Examples 1 to 6, and Reference Examples 1 to 4

A magnetic tape was manufactured in the same manner as in Example 1, except that various items shown in Table 1 were changed as shown in Table 1.

In Table 1, in the comparative examples and the reference examples in which "none" is shown in a column of the dispersion beads and a column of the time, the magnetic layer forming composition was prepared without performing the second stage in the magnetic liquid dispersion process.

In Table 1, in the comparative examples and the reference examples in which "none" is shown in a column of the homeotropic alignment process magnetic field strength, the magnetic layer was formed without performing the alignment process.

The thickness of each layer and the thickness of the non-magnetic support of each magnetic tape of the examples, the comparative examples, and the reference examples were acquired by the following method, and it was confirmed that the thicknesses obtained were thicknesses shown in Table 1.

A cross section of the magnetic tape in a thickness direction was exposed to ion beams and the exposed cross section was observed with a scanning electron microscope. Various thicknesses were obtained as an arithmetical mean of thicknesses obtained at two portions in the thickness direction in the cross section observation.

2. Various Evaluations (1) XRD Intensity Ratio

A tape sample was cut out from the manufactured magnetic tape.

Regarding the cut-out tape sample, the surface of the magnetic layer was irradiated with X-ray by using a thin film X-ray diffraction device (Smart Lab manufactured by Rigaku Corporation), and the In-Plane XRD was performed by the method described above.

The peak intensity Int(114) of the diffraction peak of the (114) plane and the peak intensity Int(110) of the diffraction peak of a (110) plane of a hexagonal ferrite crystal structure were obtained from the X-ray diffraction spectra obtained by the In-Plane XRD, and the XRD intensity ratio (Int(110)/Int(114)) was calculated.

(2) Vertical Direction Squareness Ratio

A vertical direction squareness ratio of the manufactured magnetic tape was obtained by the method described above using an oscillation sample type magnetic-flux meter (manufactured by Toei Industry Co., Ltd.).

(3) Center Line Average Surface Roughness Ra Measured Regarding Surface of Magnetic Layer The measurement regarding a measurement area of 40 µm×40 µm in the surface of the magnetic layer of the magnetic tape was performed with an atomic force microscope (AFM, Nanoscope 4 manufactured by Veeco Instruments, Inc.) in a tapping mode, and a center line average surface roughness Ra was acquired. RTESP-300 manufactured by BRUKER is used as a probe, a scan speed (probe movement speed) was set as 40 µm/sec, and a resolution was set as 512 pixel×512 pixel.

(4) generation frequency of signal defect (thermal asperity) during servo signal reproduction The magnetic tape in which the timing-based servo pattern was formed was attached to a servo tester. In this servo tester, the magnetic tape was caused to run, and the surface of the magnetic layer of the running magnetic tape was brought into contact with the servo head in which the MR element was mounted, and slid, and therefore, the servo pattern was read (servo signal was reproduced) by the servo head. In the reproduced waveform of the servo signal obtained by the reproduction, a portion which is not a normal burst signal and showing an output of 200% or more, in a case where an average value of the output of the noise level was set as 100%, was determined as a thermal asperity, and the number of times of the generation of the thermal asperity was counted. A value obtained by dividing the counted number of times of the generation of the thermal asperity by a total length of the magnetic tape (number/m) was set as thermal asperity generation frequency.

The results of the above calculation are shown in Table 1 (Table 1-1 and Table 1-2).

TABLE 1-1

| | | Magnetic liquid dispersion process second stage | | | | |
|---|---|---|---|---|---|---|
| | | Dispersion beads | | | | |
| | Kind | Bead diameter | Used amount (mass of beads with respect to mass of ferromagnetic hexagonal ferrite powder) | Time | Homeotropic alignment process magnetic field strength | Surface temperature of calender roll |
| Reference Example 1 | None | None | None | None | None | 100° C. |
| Reference Example 2 | None | None | None | None | None | 100° C. |
| Reference Example 3 | None | None | None | None | None | 90° C. |
| Reference Example 4 | None | None | None | None | None | 90° C. |
| Comparative Example 1 | None | None | None | None | None | 100° C. |
| Comparative Example 2 | None | None | None | None | 0.15 T | 100° C. |
| Comparative Example 3 | None | None | None | None | 0.30 T | 100° C. |

TABLE 1-1-continued

| | Magnetic liquid dispersion process second stage | | | | | |
|---|---|---|---|---|---|---|
| | Dispersion beads | | | | | |
| | Kind | Bead diameter | Used amount (mass of beads with respect to mass of ferromagnetic hexagonal ferrite powder) | Time | Homeotropic alignment process magnetic field strength | Surface temperature of calender roll |
| Comparative Example 4 | Diamond | 500 nm | 10 times | 1 h | 1.00 T | 100° C. |
| Comparative Example 5 | Diamond | 500 nm | 10 times | 1 h | None | 100° C. |
| Comparative Example 6 | Diamond | 500 nm | 10 times | 1 h | None | 105° C. |
| Example 1 | Diamond | 500 nm | 10 times | 1 h | 0.15 T | 100° C. |
| Example 2 | Diamond | 500 nm | 10 times | 1 h | 0.20 T | 100° C. |
| Example 3 | Diamond | 500 nm | 10 times | 1 h | 0.30 T | 100° C. |
| Example 4 | Diamond | 500 nm | 10 times | 1 h | 0.50 T | 100° C. |
| Example 5 | Diamond | 500 nm | 20 times | 1 h | 0.15 T | 100° C. |
| Example 6 | Diamond | 500 nm | 20 times | 1 h | 0.15 T | 105° C. |

TABLE 1-2

| | Thickness of magnetic layer | Thickness of non-magnetic layer | Thickness of non-magnetic support | Thickness of back coating layer | Total thickness of magnetic tape | Magnetic layer surface roughness Ra | XRD intensity ratio Int(110)/Int(114) | Vertical direction squareness ratio | Signal defect (thermal asperity) generation frequency (number of times/m) |
|---|---|---|---|---|---|---|---|---|---|
| Reference Example 1 | 0.10 μm | 1.00 μm | 4.30 μm | 0.60 μm | 0.60 μm | 1.8 nm | 0.2 | 0.55 | 0.07 |
| Reference Example 2 | 0.10 μm | 0.70 μm | 4.20 μm | 0.40 μm | 5.40 μm | 1.8 nm | 0.2 | 0.55 | 0.10 |
| Reference Example 3 | 0.10 μm | 0.70 μm | 4.20 μm | 0.30 μm | 5.30 μm | 2.2 nm | 0.2 | 0.55 | 0.06 |
| Reference Example 4 | 0.10 μm | 0.50 μm | 4.00 μm | 0.30 μm | 4.90 μm | 2.2 nm | 0.2 | 0.55 | 0.10 |
| Comparative Example 1 | 0.10 μm | 0.70 μm | 4.20 μm | 0.30 μm | 5.30 μm | 1.8 nm | 0.2 | 0.55 | 1.30 |
| Comparative Example 2 | 0.10 μm | 0.70 μm | 4.20 μm | 0.30 μm | 5.30 μm | 1.8 nm | 3.8 | 0.63 | 1.20 |
| Comparative Example 3 | 0.10 μm | 0.70 μm | 4.20 μm | 0.30 μm | 5.30 μm | 1.8 nm | 5.0 | 0.75 | 1.00 |
| Comparative Example 4 | 0.10 μm | 0.70 μm | 4.20 μm | 0.30 μm | 5.30 μm | 1.8 nm | 6.1 | 0.90 | 1.50 |
| Comparative Example 5 | 0.10 μm | 0.70 μm | 4.20 μm | 0.30 μm | 5.30 μm | 1.8 nm | 0.3 | 0.66 | 1.40 |
| Comparative Example 6 | 0.10 μm | 0.50 μm | 4.00 μm | 0.30 μm | 4.90 μm | 1.6 nm | 0.3 | 0.66 | 8.90 |
| Example 1 | 0.10 μm | 0.70 μm | 4.20 μm | 0.30 μm | 5.30 μm | 1.8 nm | 0.5 | 0.70 | 0.08 |
| Example 2 | 0.10 μm | 0.70 μm | 4.20 μm | 0.30 μm | 5.30 μm | 1.8 nm | 1.5 | 0.75 | 0.07 |
| Example 3 | 0.10 μm | 0.70 μm | 4.20 μm | 0.30 μm | 5.30 μm | 1.8 nm | 2.3 | 0.80 | 0.05 |
| Example 4 | 0.10 μm | 0.70 μm | 4.20 μm | 0.30 μm | 5.30 μm | 1.8 nm | 4.0 | 0.85 | 0.13 |
| Example 5 | 0.10 μm | 0.70 μm | 4.20 μm | 0.30 μm | 5.30 μm | 1.8 nm | 0.7 | 0.83 | 0.10 |
| Example 6 | 0.10 μm | 0.50 μm | 4.00 μm | 0.30 μm | 4.90 μm | 1.6 nm | 0.7 | 0.83 | 0.11 |

With the comparison of Reference Examples 1 to 4 and Comparative Examples 1 to 6, it was confirmed that the generation frequency of the signal defect during the servo signal reproduction significantly increases, in a case where the magnetic tape total thickness is equal to or smaller than 5.30 μm and the magnetic layer surface roughness Ra is equal to or smaller than 1.8 nm (Comparative Examples 1 to 6), compared to a case where the magnetic tape total thickness is greater than 5.30 μm (Reference Examples 1 and 2) and a case where the magnetic layer surface roughness Ra is greater than 1.8 nm (Reference Examples 3 and 4).

With respect to this, although the magnetic tape of Examples 1 to 6 has the total thickness equal to or smaller than 5.30 μm and the magnetic layer surface roughness Ra equal to or smaller than 1.8 nm, the generation frequency of the signal defect during the servo signal reproduction was significantly decreased, compared to that of the magnetic tapes of Comparative Examples 1 to 6.

One aspect of the invention can be effective in technical fields of magnetic tapes for high-density recording.

What is claimed is:
1. A magnetic tape comprising:
a non-magnetic support; and
a magnetic layer including ferromagnetic powder and a binding agent on the non-magnetic support,
wherein the total thickness of the magnetic tape is 1.00 μm to 5.30 μm,
the magnetic layer has a servo pattern,
the center line average surface roughness Ra measured regarding the surface of the magnetic layer is equal to or smaller than 1.8 nm, the ferromagnetic powder is ferromagnetic hexagonal ferrite powder, the intensity ratio Int(110)/Int(114) of the peak intensity Int(110) of a diffraction peak of a (110) plane with respect to the peak intensity Int(114) of a diffraction peak of a (114) plane of a hexagonal ferrite crystal structure obtained by an X-ray diffraction analysis of the magnetic layer by using an In-Plane method is 0.5 to 4.0, and the vertical direction squareness ratio of the magnetic tape is 0.65 to 1.00.

2. The magnetic tape according to claim 1,
wherein the vertical direction squareness ratio of the magnetic tape is 0.65 to 0.90.

3. The magnetic tape according to claim 1,
wherein the center line average surface roughness Ra measured regarding the surface of the magnetic layer is 1.2 nm to 1.8 nm.

4. The magnetic tape according to claim 2,
wherein the center line average surface roughness Ra measured regarding the surface of the magnetic layer is 1.2 nm to 1.8 nm.

5. The magnetic tape according to claim 1,
wherein the total thickness of the magnetic tape is 3.00 μm to 5.30 μm.

6. The magnetic tape according to claim 2,
wherein the total thickness of the magnetic tape is 3.00 μm to 5.30 μm.

7. The magnetic tape according to claim 3,
wherein the total thickness of the magnetic tape is 3.00 μm to 5.30 μm.

8. The magnetic tape according to claim 4,
wherein the total thickness of the magnetic tape is 3.00 μm to 5.30 μm.

9. The magnetic tape according to claim 1, further comprising:
a non-magnetic layer including non-magnetic powder and a binding agent between the non-magnetic support and the magnetic layer.

10. The magnetic tape according to claim 1, further comprising:
a back coating layer including non-magnetic powder and a binding agent on a surface side of the non-magnetic support opposite to a surface side provided with the magnetic layer.

11. A magnetic tape device comprising:
a magnetic tape, a magnetic head and a servo head,
wherein the magnetic tape comprises:
a non-magnetic support; and
a magnetic layer including ferromagnetic powder and a binding agent on the non-magnetic support,
wherein the total thickness of the magnetic tape is 1.00 μm to 5.30 μm,
the magnetic layer has a servo pattern,
the center line average surface roughness Ra measured regarding the surface of the magnetic layer is equal to or smaller than 1.8 nm,
the ferromagnetic powder is ferromagnetic hexagonal ferrite powder,
the intensity ratio Int(110)/Int(114) of the peak intensity Int(110) of a diffraction peak of a (110) plane with respect to the peak intensity Int(114) of a diffraction peak of a (114) plane of a hexagonal ferrite crystal structure obtained by an X-ray diffraction analysis of the magnetic layer by using an In-Plane method is 0.5 to 4.0, and
the vertical direction squareness ratio of the magnetic tape is 0.65 to 1.00.

12. The magnetic tape device according to claim 11,
wherein the vertical direction squareness ratio of the magnetic tape is 0.65 to 0.90.

13. The magnetic tape device according to claim 11,
wherein the center line average surface roughness Ra measured regarding the surface of the magnetic layer is 1.2 nm to 1.8 nm.

14. The magnetic tape device according to claim 12,
wherein the center line average surface roughness Ra measured regarding the surface of the magnetic layer is 1.2 nm to 1.8 nm.

15. The magnetic tape device according to claim 11,
wherein the total thickness of the magnetic tape is 3.00 μm to 5.30 μm.

16. The magnetic tape device according to claim 12,
wherein the total thickness of the magnetic tape is 3.00 μm to 5.30 μm.

17. The magnetic tape device according to claim 13,
wherein the total thickness of the magnetic tape is 3.00 μm to 5.30 μm.

18. The magnetic tape device according to claim 14,
wherein the total thickness of the magnetic tape is 3.00 μm to 5.30 μm.

19. The magnetic tape device according to claim 11,
wherein the magnetic tape further comprises a non-magnetic layer including non-magnetic powder and a binding agent between the non-magnetic support and the magnetic layer.

20. The magnetic tape device according to claim 11,
wherein the magnetic tape further comprises a back coating layer including non-magnetic powder and a binding agent on a surface side of the non-magnetic support opposite to a surface side provided with the magnetic layer.

* * * * *